(12) United States Patent
Feinbloom et al.

(10) Patent No.: US 10,667,357 B1
(45) Date of Patent: May 26, 2020

(54) LIGHT CONTROL BASED ON DEVICE ORIENTATION

(71) Applicant: Designs for Vision, Inc., Bohemia, NY (US)

(72) Inventors: Richard E. Feinbloom, New York, NY (US); Michael D. Ross, Commack, NY (US); Kenneth Koscheka, Wading River, NY (US); Bo Zhou, Centereach, NY (US); Kenneth N. Braganca, Sayvile, NY (US)

(73) Assignee: Designs for Vision, Inc., Bohemia, NY (US)

( * ) Notice: Subject to any disclaimer, the term of this patent is extended or adjusted under 35 U.S.C. 154(b) by 0 days.

(21) Appl. No.: 16/541,379

(22) Filed: Aug. 15, 2019

Related U.S. Application Data

(60) Provisional application No. 62/879,407, filed on Jul. 26, 2019.

(51) Int. Cl.
*H05B 45/10* (2020.01)
*H05B 45/22* (2020.01)
*H05B 47/11* (2020.01)
*H05B 47/19* (2020.01)
*F21Y 115/10* (2016.01)

(52) U.S. Cl.
CPC .............. *H05B 45/10* (2020.01); *H05B 45/22* (2020.01); *H05B 47/11* (2020.01); *H05B 47/19* (2020.01); *F21Y 2115/10* (2016.08)

(58) Field of Classification Search
CPC ........ H05B 45/10; H05B 45/22; H05B 47/19; H05B 47/11; F21Y 2115/10
See application file for complete search history.

(56) References Cited

U.S. PATENT DOCUMENTS

| | | |
|---|---|---|
| 3,890,383 A | 6/1975 | Rodia et al. |
| 4,195,918 A | 4/1980 | Freche |
| 4,538,070 A | 8/1985 | Herold |
| 5,440,462 A | 8/1995 | Kim |
| 5,637,863 A | 6/1997 | Sanborn |
| 5,722,762 A | 3/1998 | Soll |
| 6,290,368 B1 | 9/2001 | Lehrer |
| 6,443,604 B1 | 9/2002 | Rudenberg |
| 6,461,024 B1 | 10/2002 | Becker |
| 6,465,962 B1 | 10/2002 | Fu |
| 6,505,951 B1 | 1/2003 | Lorenzo, Jr. |
| 6,930,603 B2 | 10/2005 | Jackson |
| 6,955,444 B2 | 10/2005 | Gupta |
| 7,008,074 B1 | 3/2006 | Halm |
| 7,115,856 B2 | 10/2006 | Peng |
| 7,321,301 B2 | 1/2008 | Spoltore |

(Continued)

*Primary Examiner* — Raymond R Chai
(74) *Attorney, Agent, or Firm* — Law Office of Carl Giordano, PC

(57) ABSTRACT

A light control device providing handsfree control of a lighting source using measures of the orientation of the lighting source is presented. The measurement of the orientation of the lighting source is monitored and while the orientation retains the light outputted by the lighting source within a designated area, the light output remains in an ON state. However, with the orientation of the lighting source indicates the light output may be outside the designated area, the light output is turned OFF. In addition, a method for calibrating the system to define the designated area is disclosed.

24 Claims, 16 Drawing Sheets

(56) References Cited

U.S. PATENT DOCUMENTS

| | | |
|---|---|---|
| 7,604,378 B2 | 10/2009 | Wolf |
| 7,815,342 B2 | 10/2010 | Medinis |
| 7,884,733 B2 | 2/2011 | O'Dowd |
| 8,100,552 B2 | 1/2012 | Spero |
| 8,540,363 B2 | 9/2013 | Abreu |
| 8,851,709 B2 | 10/2014 | Feinbloom |
| RE46,463 E | 7/2017 | Feinbloom |
| 9,791,138 B1 | 10/2017 | Feinbloom |
| 10,240,769 B1 | 3/2019 | Feinbloom |
| 2004/0240208 A1 | 12/2004 | Beasley |
| 2004/0264175 A1 | 12/2004 | Willougbly |
| 2004/0264176 A1 | 12/2004 | Vanderschuit |
| 2005/0099824 A1 | 5/2005 | Dowling |
| 2006/0023455 A1 | 2/2006 | Hardin |
| 2008/0205036 A1 | 8/2008 | Tarter |
| 2008/0310145 A1 | 12/2008 | Blake |
| 2012/0120636 A1 | 5/2012 | Wilt |
| 2012/0275140 A1 | 11/2012 | Feinbloom |
| 2013/0314903 A1 | 11/2013 | Nakamura |
| 2014/0035459 A1* | 2/2014 | Windom ............. F21V 23/0492 315/33 |
| 2015/0003049 A1* | 1/2015 | Chang .................... A61B 90/30 362/105 |
| 2015/0016094 A1* | 1/2015 | Yamai ................... F21V 21/084 362/105 |
| 2015/0377462 A1 | 12/2015 | Wilt |
| 2017/0051903 A1* | 2/2017 | Maglica ............. F21V 23/0421 |

* cited by examiner

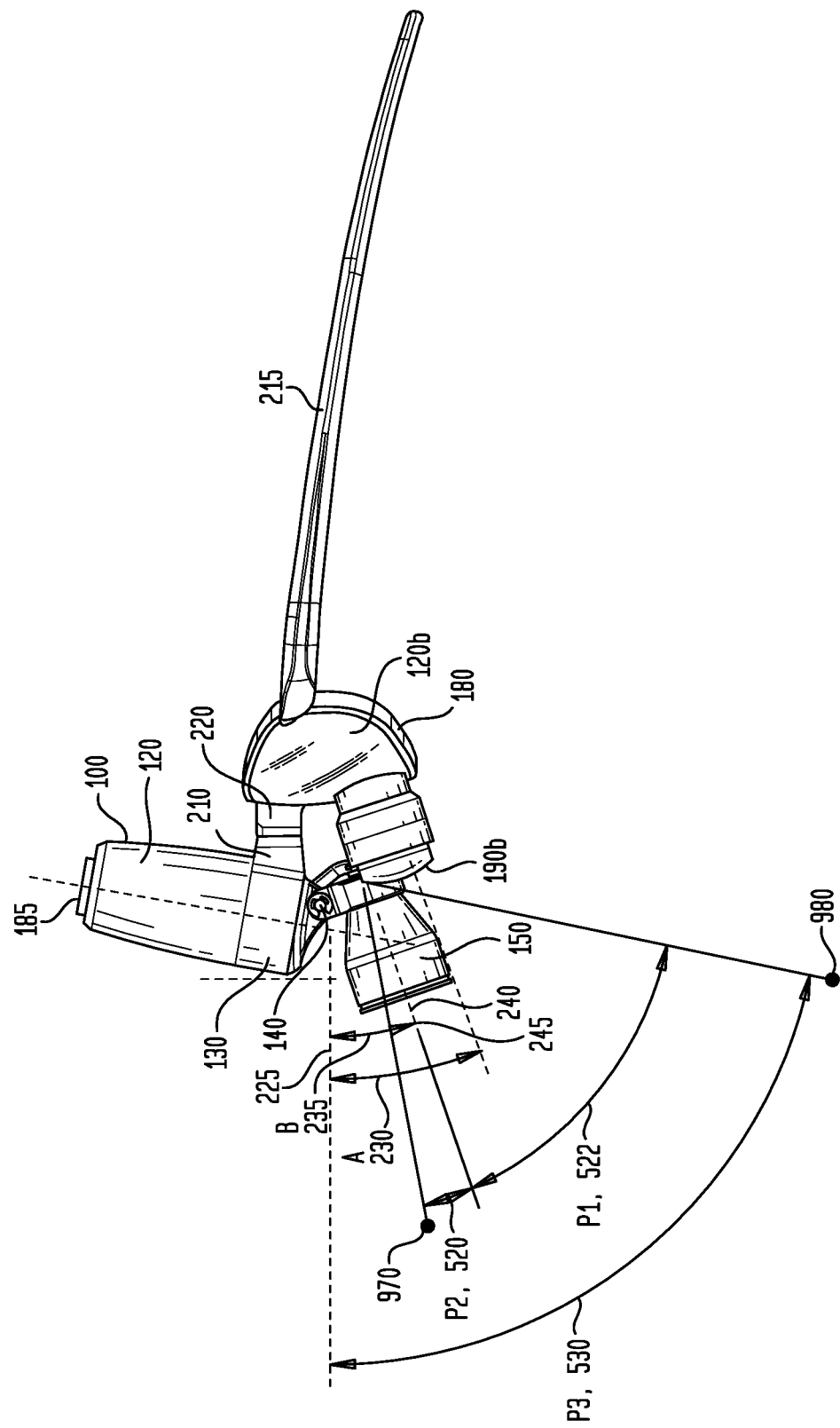

LIGHT CONTROL BASED ON DEVICE ORIENTATION

CLAIM OF PRIORITY

This applicant claims priority to and the benefit of the earlier filing date of US Provisional application Ser. No. 62/879,407 filed on Jul. 26, 2019, the contents of which are incorporated by reference, herein.

FIELD OF THE INVENTION

This application is related to the field of lighting and more particularly a system for remotely controlling illumination devices used for directing light to a desired area.

RELATED APPLICATION

This application is related to the U.S. Pat. No. 8,851,709, RE 46,463, 9,791,138 and 10,240,769, the contents of all of which are incorporated by reference, herein.

BACKGROUND OF THE INVENTION

Head-mounted lighting devices are typically used in dental, medical and/or surgical fields to allow practitioners (e.g., dentist, doctor) to have a light applied directly to the area where the practitioner is viewing. Head-mounted lighting devices are advantageous over overhead type lighting devices as the practitioner's shadow is not projected onto the work area. Operation of such devices using hand-free control is known in the art. For example, U.S. Pat. No. 8,851,709, RE46,463 9,791,138, and 10,240,769, which are assigned to the Assignee of the instant application, disclose hands-free operation of the control of head-mounted lighting devices.

Typically, a practitioner (e.g., a dentist, a doctor, a surgeon) adjusts the lighting element such that the light is projected onto a surface to which the practitioner's eyes are focused. The practitioner may then control the light output in a manner as disclosed in the aforementioned US patents.

However, in certain situations, control of the lighting unit is prohibited due to criteria imposed upon the practitioner. For example, a surgeon is not allowed to raise their hands near the lighting unit after having been sterilized.

Hence, users of head borne lighting have expressed a desire to activate their light when they are in a working position and deactivate their light when they are outside of that working position. This allows them to activate the light where they need it, without requiring them to move their hands from the sterile field.

Hence, there is a need in the industry for providing a means for controlling the light output based on biometric measurements of the practitioner.

SUMMARY OF THE INVENTION

In accordance with the principles of the invention, a lighting device is disclosed that allows for the calibration of a lighting element orientation.

In accordance with the principles of the invention, a lighting device is disclosed that allows for the control of the output of a projected light based on a n orientation of a user with respect to a calibrated position.

In accordance with the principles of the invention, a light device is disclosed that allows for the control of an output of a projected light after setting a Line-of-Sight reference axis after calibration has occurred.

In accordance with the principles of the invention, the orientation of the lighting device within a region of acceptable light output is determined to determine whether the lighting device is to be turned ON or turned OFF.

In accordance with the principles of the invention, a biometric light control device is disclosed, which comprise a light source configured to output a light along an optical axis; and a light control device comprising at least a position detector circuit configured to determine an orientation of the light source with respect to at least one axis in a coordinate system and a processor configured to compare each of the signals associated with a corresponding one of the at least one axis with known limit values associated with the corresponding one of said at least one axis, wherein the known limit values are established with respect to a reference axis, determine whether said orientation of said light source is within said known limit values associated with each of said at least one axis; and control the passage of electrical energy to the light source when the position of said light source is determined within the known limit values associated with each of the at least one axis.

In accordance with another aspect of the invention, a light control system is disclosed comprising a light source configured to output a light along an optical axis, a position detector circuit configured to determine an orientation of the optical axis and a processor configured to: compare a current orientation of the optical axis with a prior orientation of the optical axis, determine a region of acceptance about the current orientation of the optical axis when the current orientation of said optical axis is different than the prior orientation of the optical axis, determine whether a fixed reference is within the determined region of acceptance; and alter operation of the light source to prevent the output of the light when the fixed reference is outside said region of acceptance.

BRIEF DESCRIPTION OF DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 5 illustrates a side view of the lighting device, similar to that shown in FIG. 2.

It is to be understood that the figures and descriptions of the present invention described herein have been simplified to illustrate the elements that are relevant for a clear understanding of the present invention, while eliminating for purposes of clarity, many other elements. However, because these omitted elements are well-known in the art, and because they do not facilitate a better understanding of the present invention, a discussion of such elements is not provided herein. The disclosure herein is directed also to variations and modifications known to those skilled in the art.

DETAILED DESCRIPTION

Figure 1:
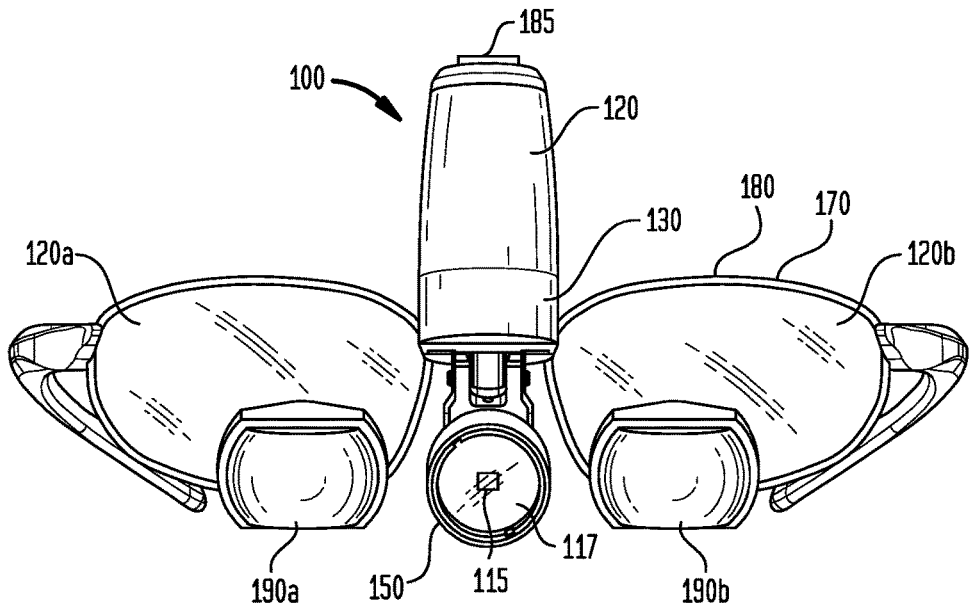
FIG. 1 illustrates a front view of a first exemplary embodiment of a lighting device in accordance with the principles of the invention.

FIG. 1 Illustrates a front view of a head-mounted lighting device comprising an eyewear 180 comprising a frame 170 containing a left lens 120a and a right lens 120b into which are magnification devices 190a, 190b respectively. Although the head mounted lighting device illustrated refers to an eyewear 180, it would be understood other types of head mounted light device are considered within the scope of the invention. For example, U.S. Pat. No. RE 46463, whose contents have been incorporated by reference, herein, illustrates head mountings, such as a head strap and headband, that are considered within the scope of the term "head mounted lighting devices.

Further illustrated is lighting device 100 comprising a battery assembly 120, an electronics section 130 and a lighting element 150. Within lighting element 150 is shown, through lens 117, a lighting source (e.g., light emitting diode) 115. Lens 117 seals an open end of lighting element 150.

Further illustrated is a sensing unit 185 positioned along a top of battery assembly 120. Although not shown it would be appreciated that sensing unit 185 may be positioned on or in electrical contact with electronics section 130. Sensing unit 185 may be one of a contact sensor such as a capacitive touch sensor or a contactless sensor, such as an infra-red (IR) sensor, an ultra-sonic sensor, a proximity sensor, and other similar devices. Battery assembly 120 incorporates a battery, therein, (not shown) that provides power (electrical energy in the form of a voltage and/or current) to lighting source 115. Although the battery is disclosed with regard to battery assembly 120, it would be understood that the battery (or source of electrical energy provided to the lighting source 115) may be remote from the head mounted lighting device. See, for example, U.S. Pat. No. RE46463, whose contents have been incorporated by reference, herein.

Electronic section 130 includes circuitry (not shown) that controls the application of the electrical energy (i.e., voltage/current) from the battery (not shown) to lighting source (e.g. light emitting diode (LED)) 115. Information from sensing unit 185 to the circuitry within electronic section 130 may also provide information suitable for controlling the state of the lighting source 115 within lighting element 150.

Figure 2:
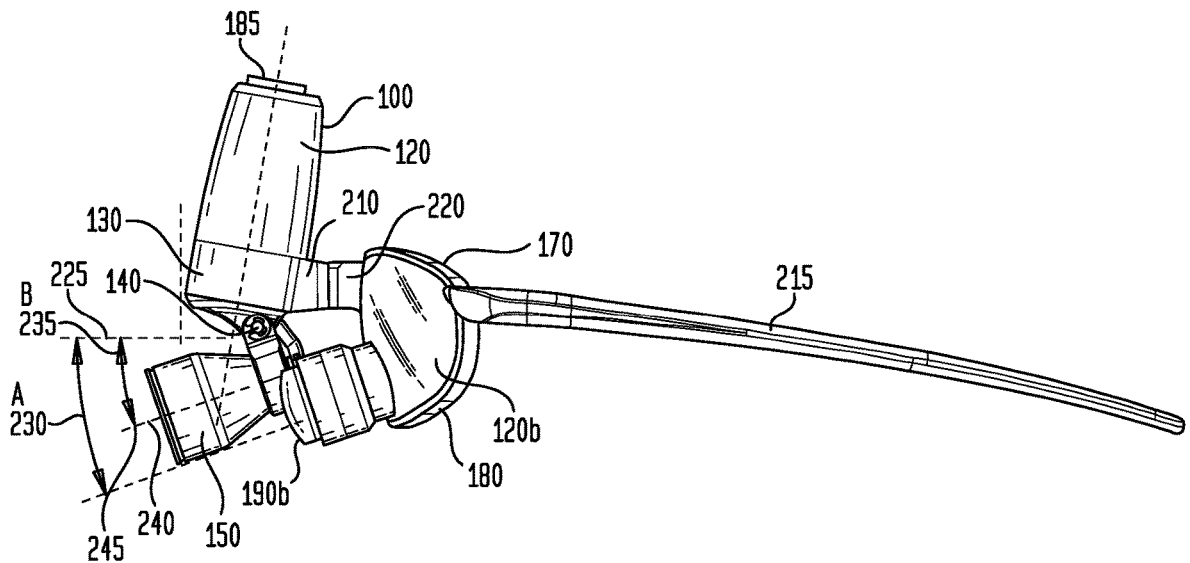
FIG. 2 illustrates a side view of the lighting device in accordance with the principles of the invention.

FIG. 2 illustrates a side view of the head-mounted lighting device shown in FIG. 1, wherein temples 215 extending from frame 170 retain head-mounted lighting device to a user. Lighting device 100 is shown attached to eyewear 180 by a connection of connector 210 on lighting device 100 to connector 220 attached to eyewear 180. Lighting device 100 may be permanently or removably attached to eyewear 180.

Further illustrated is the orientation of the magnification lens 190b downward at an angle A 230 with respect to horizontal axis 225. The downward orientation of the magnification lens 190b enables the user or practitioner to focus their view downward.

Additionally, lighting element 150 may be pivotally attached to an electronic section 130 through a pivot point 140. Allowing lighting element 150 to be pivotable with respect to the electronic section 130 provides for the customized adjustment of lighting element 150 based on the user's needs. Hence, the angle B 235 associated with the lighting element 150 may be set at the same angle or at a different angle from angle A 230 associated with magnification lens 190b.

In one aspect of the invention the angles A 230 and B 235 may be set by the manufacturer to be the same or to be different. In this one case, angles A 230 and B 235 are set to be substantially the same, such that the light output of light source 115 may be projected onto an area to which magnification lens 190a, 190b are focused. That is, the light outputted by light source 115 is passed through lens 117, such that the light outputted is outputted along an optical axis 245 of lens 117. In this case, the pre-set angle B 235, which further corresponds to the optical axis 245, may be used as a Line of Sight reference axis or line 240 from which control of the light output of lighting element 150 may be controlled, as will be further discussed.

In accordance with another aspect of the invention, angle B 235 may be set by the user, wherein sensing unit (or sensor) 185 may be used to set or calibrate the angle B 235 of the lighting element 150. The angle B 235 set by the user may then be used as a Line of Sight reference axis or line 240 from which control of the light output of light source 115 in lighting element 150 may be determined, as will be further discussed. Though not shown it would be recognized that the Line of Sight reference axis 240 is substantially similar to the optical axis 245 of lighting element 150. The optical axis 245 of light element 150 is that axis extending from lighting source 115 through lens 117. In this illustrated embodiment, Line of Sight reference axis 240 is substantially similar to optical axis 245.

However, it would be understood that Line of Sight reference axis 240 may be established as any desired axis. For example, horizontal axis 225 may be established as Line of Sight reference axis 240 and optical axis 245 is at a known angle downward (depression angle) from the horizontal 225/Line of Sight reference axis 240.

Figure 3:
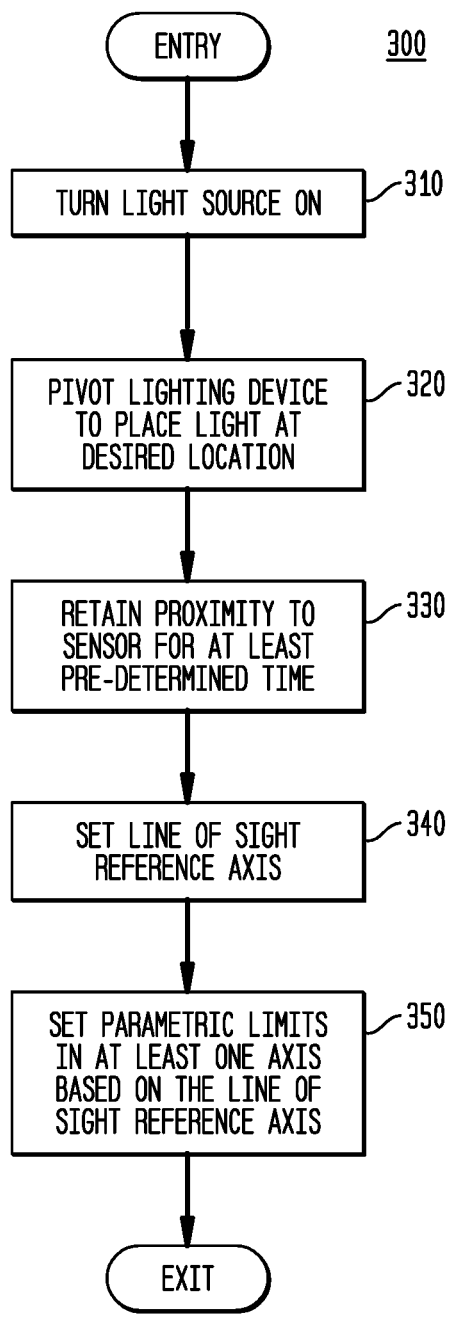
FIG. 3 illustrates a flow chart of an exemplary process for determining a Line of Sight reference axis in accordance with the principles of the invention.

FIG. 3 illustrates a flow chart 300 of an exemplary processing for user control setting of a Line of Sight reference line of lighting element 150 from which control of light source 115 using biometric information in accordance with the principles of the invention. In this illustrated exemplary embodiment, light source 115 is turned on at step 310 such that a light output may be directed toward a surface. The user may then pivot the lighting element 150 at step 320 such that the light output of light source 115 within lighting element 150 is directed towards a desired point of the surface. The user may then set the orientation of a Line of Sight reference axis for the subsequent control of lighting source 115 by engaging sensor 185 for a predetermined time, step 330. In this illustrated case, the Line of Sight reference axis 240 is established to be substantially similar to the optical axis 245, as it provides maximum light output onto the surface to which lens 190a/b are focused. Line of Sight reference line or axis 240 may then be retained at step 340. At step 350, parametric control limits are then established based on the retained Line of Sight reference axis or line value 240. In one aspect of the invention, the parametric control limits may be established with respect to Line of Sight reference line 240. The parameter control limits may be established, for example, to be +/−10 degrees from the Line of Sight reference line 240. In a second aspect of the invention, the parametric control limits may be established as absolute values with respect to horizontal axis 225. For example, 5 degrees below horizontal axis 225 through 85 degrees below horizontal axis 225. In another aspect of the invention, the parametric control limits may be a combination of relative and absolute values. For example, 10 degrees above Line of Sight reference axis 240 and 85 degrees below horizontal line 225.

Figure 4:
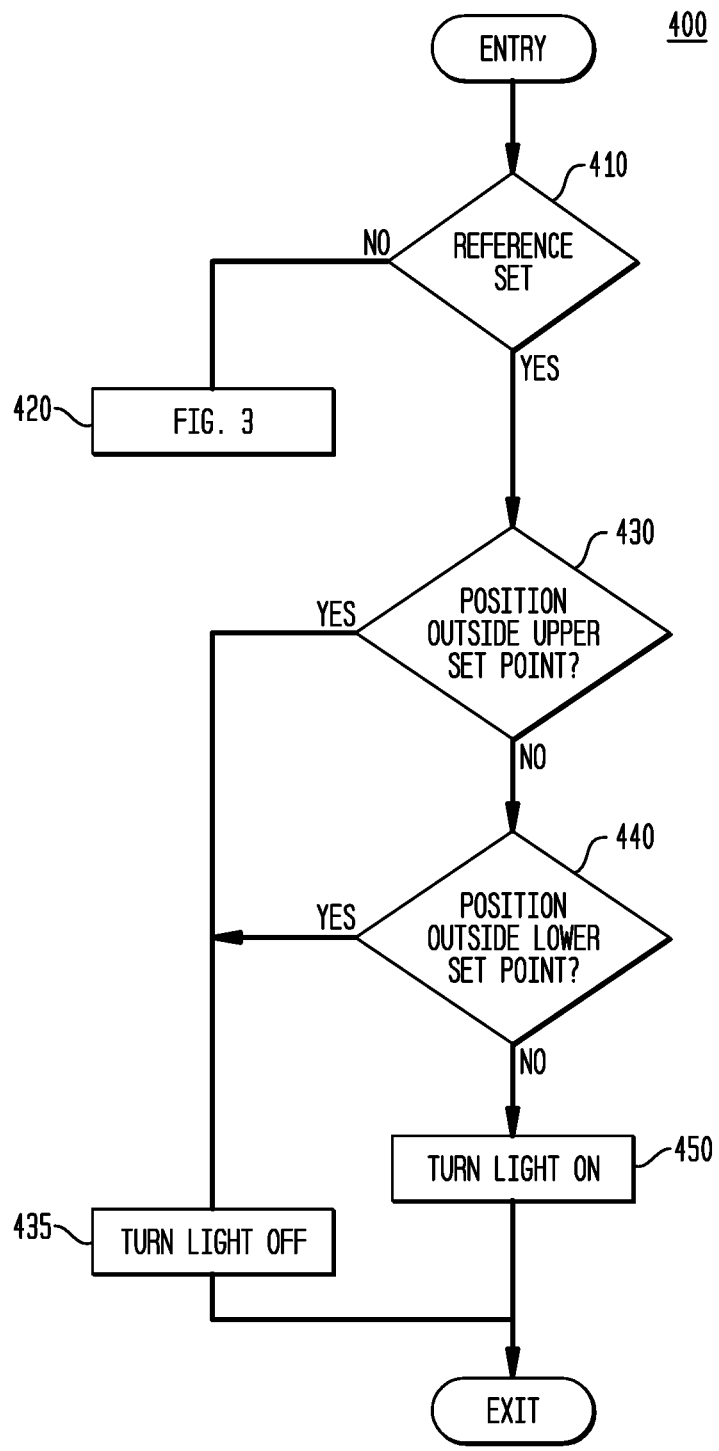
FIG. 4 illustrates a flow chart of an exemplary process for controlling the light output of a lighting device.

FIG. 4 illustrates a flow chart 400 of an exemplary processing for controlling a light output of light source 115 based on a position of lighting element 150 with respect to Line of Sight reference axis 240, which may be pre-set or set by the user.

In accordance with principles of the invention, a determination is made at step 410 as to whether a Line of Sight reference axis 240 has been established. If not, then processing continues to step 420, wherein the processing disclosed in FIG. 3 is performed. Otherwise, processing continues to step 430, wherein a determination is made as to whether an orientation of lighting element 150 is greater than, in this exemplary case, 10 degrees above the Line of Sight reference axis 240. If yes, then processing continues to step 435 where light source 115 is turned off. That is, when the optical axis 245 of headlight element 150 is greater than 10 degrees (for example) above the Line of Sight reference axis 240 the lighting source 115 is turned OFF.

However, if the orientation of lighting element 150 is not greater than 10 degrees from Line of Sight reference axis 240 then a determination is made at block 440 whether the orientation of lighting element 150 is greater than 85 degrees from horizontal axis 225 (independent of whether the horizontal axis 225 is selected as the Line of Sight reference axis 240 or not). If the lighting element 150 is greater than 85 degrees from the horizontal axis 225 then processing continues to step 435 where lighting source 115 is turned OFF. Otherwise, processing continues to step 450 where light source 115 is turned on (or retained in an ON state).

In one specific example, FIG. 4 may illustrate the processing associated with the pitch or Y axis movement of a user's head, wherein movement in an upward direction that results in an orientation of the optical axis of headlight element 150 to be greater than 10 degrees above the Line of Sight reference axis 240 results in electrical energy being removed from lighting source 115.

According to the principles of the invention, shown in FIG. 4, biometric information regarding movement of the user's head (and consequently the headlight element 150 attached to the user's head), in one axis of a coordinate system may then be used to determine operation of the lighting source within a headlight.

FIG. 5, which is comparable to the side-view of the eyewear shown in FIG. 2 and uses similar Line of Sight reference labelling, illustrates an exemplary configuration of a window of acceptance with regard to operation of the headlight element 150 in accordance with the principles of the invention. In this illustrated case, a window of acceptance is taken with respect to a Line of Sight reference axis 240 of the lighting element 150, which may be set by the user, as discussed or pre-set by the manufacturer. For example, in this case, the Line of Sight reference axis 240 is shown comparable to the optical axis 245 of the headlight element 150, which is substantially comparable to the angle of depression A, 230, with respect to horizontal axis 225, of the magnification devices 190b.

The window of acceptance is further illustrated as being a known number of degrees, for example, 50 degrees (represented by P1, 522) below the Line of Sight reference axis 240 and a second known number of degrees, for example, 10 degrees (represented by P2, 520) above Line of Sight reference axis 240. Although P1 and P2 are shown to be of a different number of degrees, it would be recognized that the values of P1 and P2 may be the same or different, as illustrated. Furthermore, while the Line of Sight reference axis 240 is illustrated as being comparable to the angle of depression of the optical axis of lighting element 150, it would be recognized that the Line of Sight reference axis 240 and the values of P1 and P2 may set by the user or preset by the manufacturer.

Furthermore, angles P1 and P2 may be measured with respect to the Line of Sight reference axis 240. Or may be set at desired absolute angles with respect to the horizontal axis 225. For example, an acceptable window of positioning of lighting element 150 may be between 10 degrees to 50 degrees, for example, about Line of Sight reference axis 240, as discussed. In another aspect of the invention, P1 and P2 may be then set such that P2 is measured 10 degrees, for example, above the Line of Sight reference axis, 240 while P3, 530, may be determined to be 85 degrees below the horizontal axis 225. For example, with Line of Sight reference axis 240 set at a 45 degree downward (or depressed) angle from the horizontal axis 225, for example, the acceptable window of lighting element 150 may be between 35 and 85 degrees below the horizontal axis (i.e., 10 degrees above the Line of Sight reference axis and 40 degrees below the Line of Sight reference axis 240. In accordance with the configuration shown in FIG. 5, any position of the lighting element 150 outside this acceptable window forces the lighting source 115 to be turned off.

Figure 6B:
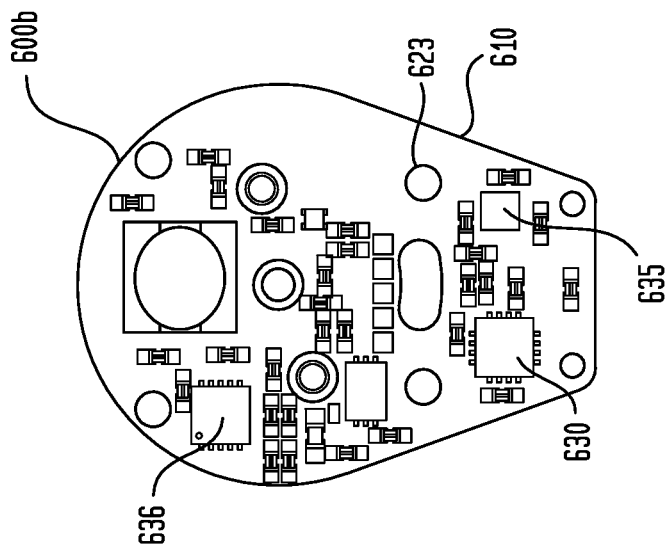
FIGS. 6A and 6B illustrate exemplary electronic circuitry for controlling the light output of a lighting device.
Figure 6A:
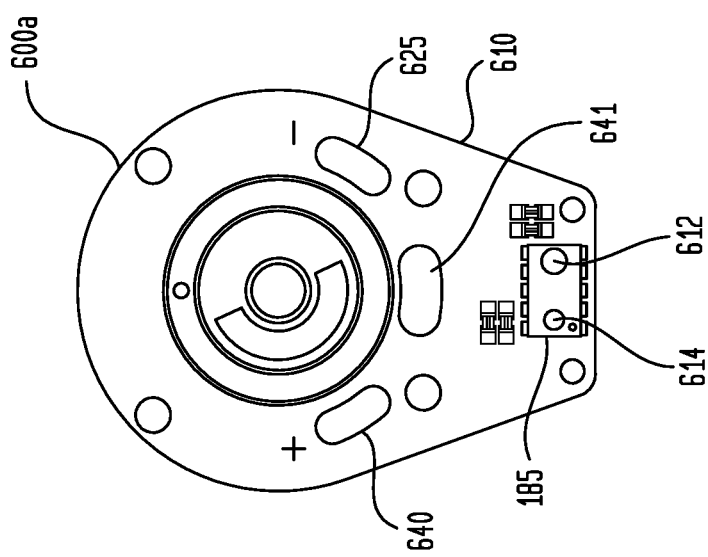

FIG. 6A illustrates a top view 600a of an exemplary printed circuit board 610 contained within electronics section 130. Printed circuit board 610 includes electronic circuits including numerous well-known electronic components (e.g., resistors, capacitors, switches and transistors). Also shown are positive electrical contact 640 and negative electrical contact 625 positioned on the top side 600a of the printed circuit board 610. Positive contact 640 and negative contact 625 represent contact points through which electrical power from an electrical source (such as the battery contained within battery assembly 120) may be applied to lighting source 115 (see FIG. 1). Electrical energy provided from an electric source, such as a battery or power supply, to the PCB 610 may be provided to the light source 115 through one or more switches 623 that is controlled by the electronic circuitry 630 (see FIG. 6B).

Also, shown is sensing device 185, which in this illustrated embodiment is contained on PCB 610, including IR transmitter 612 and IR receiver 614. In this illustrated configuration, the sensing device 185 is shown attached to the printed circuit board 610.

However, it would be recognized that the sensing device 185 comprising IR transmitter 612 and IR receiver 614 may be positioned external to printed circuit board 610 (as shown in FIG. 1, for example) and may be electrically connected to printed circuit board 610 by one or more electrical connections.

FIG. 6B illustrates a bottom view 600b of the exemplary printed circuit board 610 shown in FIG. 6A, wherein numerous well-known resistors, capacitors and/or transistors are shown. Also shown are electronic circuit 630, such as a general purpose microprocessor programmed to respond to the provided inputs, or an embedded processor, such as an ASIC (Application Specific Integrated Circuit) or FPGA (Field Programmable Gate Array) that may be programmed to respond to inputs in a desired manner, LED driver 636 that regulates the power provided to light source 115, and position detecting device (PDD) 635. PDD 635 is suitable for measuring one or more positions relative to one or more of an X, Y and Z axes, from which a determination of the orientation of the printed circuit board (PCB) 610 may be made. PDD 635 provides a signal to the electronic circuit 630 that affects the presentation of the battery voltage to the at least one lighting source 115 through switch 623.

In one aspect of the invention, the PDD 635 differentiates between a reference angle set by the user and the orientation of PDD 635 (and consequently PCB 610) to control headlighting device assembly 150.

In accordance with the principles of the invention, a nominal position of the eyeglass 180 is on a user's face with the temples 215 extended over the ear. In this position or orientation, Line of Sight reference axis 240 of headlight device 150 may be established as previously discussed. For example, the Line of Sight reference axis 240 may be established by the user using information from the sensing element 185, as previously discussed. With the detection of an object proximate to the sensing element 185 for at least a known period of time. In accordance with one aspect of the invention, a signal may be sent from the sensing element 185 to the electronic circuit 630 to establish a current orientation of the headlight element 150, with respect to a reference coordinate system as Line of Sight reference axis 240. In addition, an indication (e.g., visual, audio) may be provided to the user to inform the user that the Line of Sight reference axis 240 has been established. The orientation of the Line of Sight reference axis 240 with respect to a known coordinate system may be stored in electronic circuitry 630 to be used to establish an acceptable angular window of operation. For example, an acceptable angular window may be defined as within −10 degrees upward from Line of Sight reference axis 240 and 30 degrees downward from Line of Sight reference axis 240. Additional examples of acceptable angular windows have been previously discussed and it would be apparent from the teaching herein that the referred-to examples of angular acceptance windows are not the only acceptance windows contemplated by the inventors. Thus, additional combinations of acceptable angular windows are considered within the scope of the invention claimed.

Accordingly, after setting the Line of Sight reference axis, 240, when the orientation of eyeglass or eyewear 180 (or lighting element 150 containing light source 115) is outside of an agreed-to acceptable window of operation, e.g., hanging downward by a neck-chain or positioned upside down on a planar surface, then PDD 635 may determine eyewear 180 (or lighting element 150 containing light source 115) is in an undesired orientation and cause the electrical energy from the battery element contained within battery assembly 120 to be removed from the lighting source 115.

Similarly, if the user raises their head such that the orientation of lighting element 150 is raised above for example, an angle greater than 10 degrees above the Line of Sight reference axis 240, PDD 635 determines the lighting element 150 is in an undesired orientation and causes the electrical energy from the battery element contained within battery assembly 120 to be removed from the lighting source 115.

A signal from PDD 635 may be provided to electronic circuit 630, wherein the electronic circuit 630 may determine the orientation of the lighting source 115 and control the presentation of the battery output voltage from the battery element contained within battery assembly 120 to the at least one lighting element 115.

As previously discussed, the bounds of acceptable window orientation of the position detecting unit (PDD) 635 may be established as an angular value about Line of Sight reference axis 240, which is associated with an angle of depression (B 235) from horizontal axis 225. Accordingly, when PDD 635 determines the orientation of headlight element 150 is within an acceptable angular range from the Line of Sight reference axis 240, PDD 635 provides a first (e.g., positive) output to electronic circuitry 630. However, when the PDD 635 determines the orientation of headlight element 150 is outside the known or acceptable angular range, then PDD 635 provides as second (e.g., negative) output to electronic circuitry 630, which causes the electrical energy provided from the battery element contained within battery assembly 120 to the lighting source 115 to be removed.

In another aspect of the invention, the determination of the orientation of the headlight element 150 by PDD 635 may be made based on a determination of the orientation of headlight element 150 by PDD 635 over a period of time. For example, a plurality of samples of the orientation of headlight element 150 may be taken over a known period of time by PDD 635 and provided to electronic circuitry 630. Electronic circuitry 630 may include processing (e.g., algorithms) that collect the sampled orientation data to determine the orientation of the headlight element 150 and whether the orientation of headlight element 150 is within an acceptable angular range. For example, when an error in orientation of headlight element 150 from one sample to another sample is within a known tolerance (e.g., +/−1 degree), over each of the collected samples, then the orientation of the headlight element 150 may be deemed stable and then a determination may be made as to whether the orientation of the headlight element is within an acceptable range.

However, in another aspect of the invention, if the error between samples is greater than a known tolerance value (e.g., +/−5 degree) then PDD 635 may determine the eyewear 180 (or lighting element 150 containing light source 115) is in an erratic or a non-uniform movement. In this case, the erratic movement of the eyeglass wear 180 may indicate that the eyeglass wear is hanging and not fixed to the user. In this case, PDD 635 may provide a signal to electronic circuitry 630 to cause the electrical energy from battery within battery assembly 120 to be removed from light source 115.

In accordance with the principles of the invention, PDD 635 may comprise a 3-axis accelerometer capable of measuring rate of movement of the PDD 635 (and PCB 610) in each of three known axes in a conventional coordinate system. The measurement of rate of movement (i.e., acceleration) may be factored into filters that are used to determine the position of the headlight element 150 with respect to a corresponding one of the X, Y and Z axes, and further an orientation of the headlight element 150 with respect to the Line of Sight reference axis 240. Similarly, PDD 635 may be a 3-axis gyroscope that determines a position or an orientation of the headlight element 150 with respect to each of the three axes within the 3 dimensional coordinate system.

Returning to FIG. 6A, an ambient light sensor 641 may also be incorporated onto PCB 610; in this illustrated embodiment onto the upper surface 600a. Ambient light sensor 641 may be configured to measure a level of a surrounding light and, in one aspect of the invention, set a threshold value based on the determined ambient light level. In this exemplary aspect, the threshold values may be adjusted, for example, from preset threshold levels when a high ambient light level is determined. In another aspect of the invention, the ambient light sensor 641, may determine whether a frequency (or wavelength) of light corresponding to the transmitted light of the transmitter 612 exists in a surrounding light and/or measure a level of the frequency/wavelength of light corresponding to the transmitted light of the transmitter 612 in the ambient light. The ambient sensor 641 may then, based on at least one of the determined existences, or the level, of a frequency/wavelength of light corresponding to the transmitted light of the transmitter 612, raise or adjust threshold values from their preset values. Hence, in a high ambient light condition, wherein a wavelength of the transmitted light of transmitter 612 is found in the surrounding ambient light, then the threshold values may be increased such that the surrounding ambient light is not considered as part of any reflected light.

In accordance with another aspect of the invention, control of the application or removal of electrical energy to light source 115 may further be determined based on the detection of an object proximate to the sensing element 185 for a period of time less than a known predetermined time. For example, the light output by lighting element 115 may be increased or decreased for each detection of an object proximate to sensing element 185.

Assuming sensing element 185 is an IR sensor comprising transmitter 612 and detector (or receiver) 614, a detection by the detector 614 of a reflection of the signal transmitted by transmitter 612 may indicate a brightness control (i.e. increase, decrease) while the headlight element 150 is within the determined window of acceptance. Whereas, detection of reflected signals when the orientation of headlight element 150 is outside the determined window of acceptance may have no effect on the electrical energy applied to the lighting source 115. As discussed above, when the orientation of the headlight element 150 is outside the determined window of acceptance, the electrical energy provided to the lighting source 115 is removed from the lighting source 115.

In accordance with another aspect of the invention, a measure of the reflected signal may be utilized to distinguish between a calibration signal (i.e., presence of a reflected signal for a pre-determined time) and a control signal (i.e., a passing object). For example, a high amplitude signal for at least the predetermined time may be used to indicate a calibration phase to set the Line of Sight reference axis, whereas a lower amplitude signal for less than the predetermined time may be used to determine a brightness control, for example.

Figure 7:
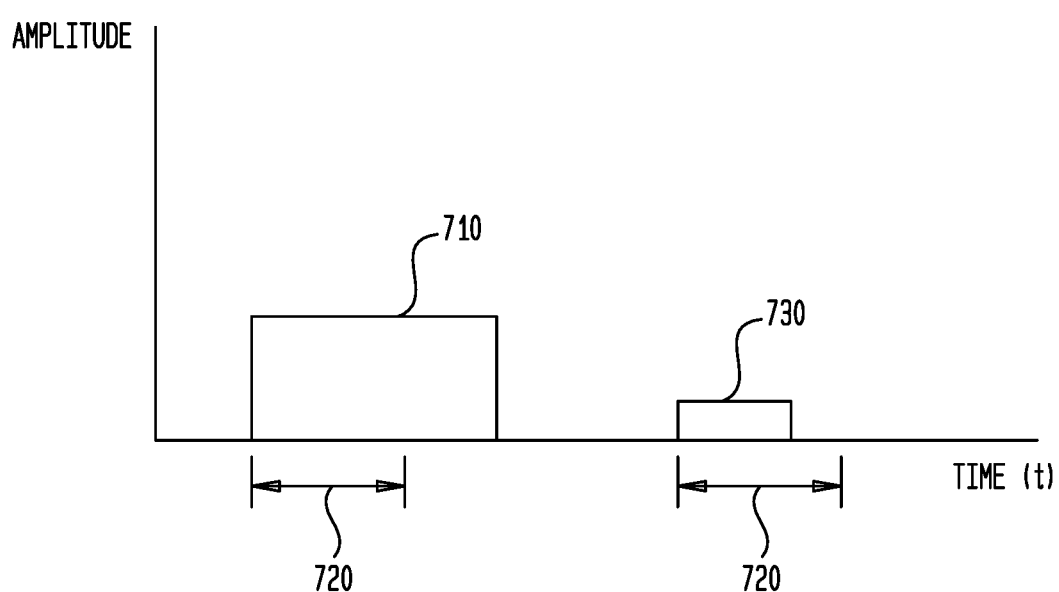
FIG. 7 illustrates an exemplary timing diagram for controlling the light output of a lighting device.

FIG. 7 illustrates an exemplary timing diagram wherein a signal transmitted by transmitter 612 may be reflected back toward receiver 614 when an object is placed within a path of the transmitted signal. In this exemplary case, reflected signal 710 is illustrated as being present for an extended period of time (greater than the predetermined time) 720 to indicate a calibration phase, wherein the Line of Sight reference axis 240 is established. In this illustrated example, a user's hand may be held in front of sensing unit 185 for the illustrated time, wherein the reflected signal is present at the receiver 614 for the time the object (e.g., a hand) is held within the transmitted signal's path. In addition, a magnitude of the reflected signal may be higher in that the object is held significantly closer to the transmitter 612.

Further illustrated is a second signal 730 that extends for a period of time less than the predetermined time 720. In this case, the detected signal may be determined to be a brightness control signal, a color temperature change signal or a wavelength/frequency change signal, when an object (e.g., a hand) passes quickly through the signal transmitted by transmitter 612. In addition, the reflected signal may have a lower amplitude as the object (e.g., hand) may pass through the signal transmitted by the transmitter 612 as a distance that is further than that of the calibration signal. For example, in one aspect of the invention, the detection of a reflected signal having a duration less than the predetermined time may increase the light intensity output for each detection until a maximum output occurs and then reduce the light intensity for each detection until a minimum output occurs. Alternatively, the detection of a reflected signal having a duration less than the predetermined time may cause the color temperature of the light outputted to change such that the light output may increase through stages from about 2700° C. (soft white) to about 3000° C. (bright white) or other similar temperatures. Alternatively, the detection of a reflected signal having a duration less than the predetermined time may cause the wavelength of the light outputted by the LED to change from, for example, white to a yellow, wherein white may be used for illumination while yellow may be used for adhesive curing.

Although the example provided, herein, is discussed with regard to the transmission of a signal and the detection of a reflection of the signal (wherein the transmitted signal is at least one of: an IR signal, a UV signal, an sonic signal, and an ultra-sonic signal and other similar transmission signals), it would be appreciated that the controlling of setting the Light-of-Sight axis or altering the output conditions of the lighting source 115, may similarly be performed using a touch switch, wherein the touch switch may comprises at least one of: a capacitive touch, a mechanical touch switch, wherein the mechanical touch switch may be one of: a toggle switch and a button switch and other similar mechanical switches.

In accordance with further aspects of the invention, control of a light source 115 (i.e., the application of an electrical energy to the lighting source 115) may be performed based on biometric movement shown as illustrated in FIG. 4, for example, wherein electrical energy may be applied to lighting source 115 while the orientation of headlight element 150 is within an acceptable window. In illustrated example, +10 degrees above the Line of Sight reference axis 240 and greater than 85 degrees below a horizon axis 225. In addition, stability of a plurality of orientation measurements may also be considered to determine or to supplement the decision to apply electrical energy to or remove electrical energy from lighting source 115.

Although a single axis measurement is shown in FIG. 4, it would be understood that PDD 635 may determine the orientation of headlight element 150 with respect to Line of Sight reference axis 240 in a 3-dimensional coordinate system. Hence, it would be understood that the processing disclosed, herein, may be refined such that biometric movement in one or more directions may allow for the control of lighting element 115.

Figure 8:
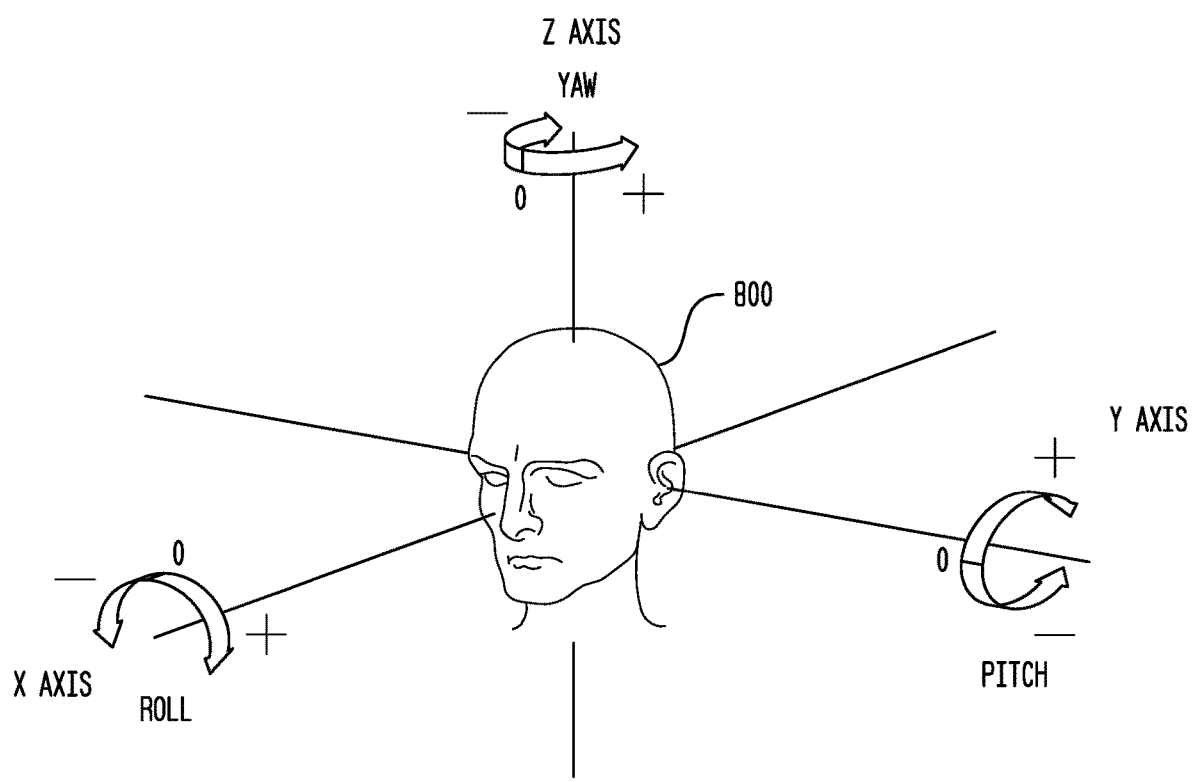
FIG. 8 illustrates an exemplary coordinate system.

FIG. 8 illustrates a conventional 3-dimensional axis system 800 taken with respect to a person.

As shown, the Yaw or Z axis provides a reference for measurement of movement of a user's head (onto which is placed eyewear 180, which is not shown) in a left to right or a right to left direction. Further shown is a Roll or X axis that provides a reference for measurement of movement of a user's head in a left down/right up or left up/right down tilted direction. A Pitch or Y axis provides a reference for measurement of movement of a user's head in an up/down tilting direction. Changes in Yaw are measured as changes in a plane defined by the X and Y axes. Changes in Roll are measured as changes in a plane defined by the Y and Z axes. And changes in Pitch are measures as changes in a plane defined by the X and Z axes.

Figure 9:
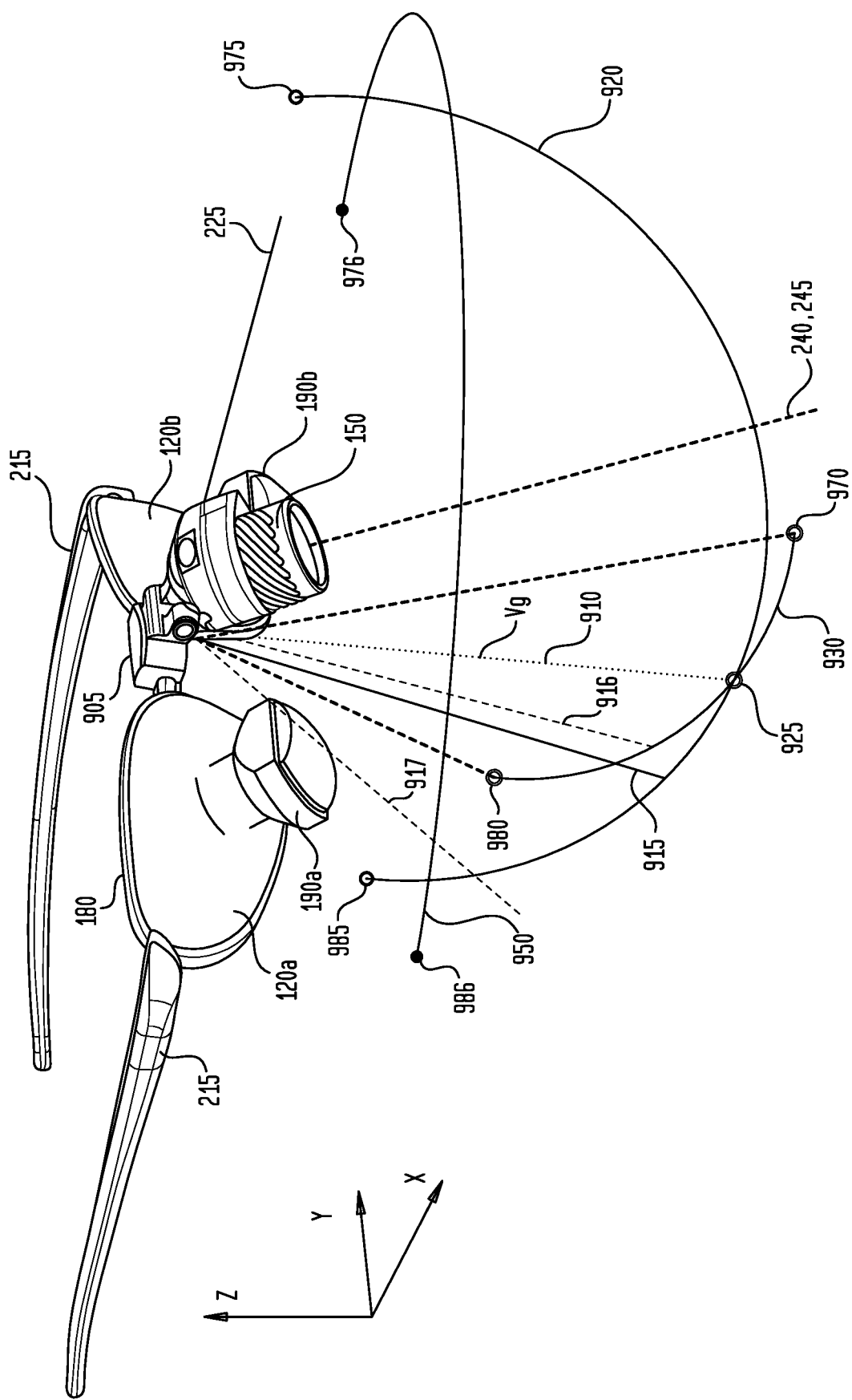
FIG. 9 illustrates a prospective view of for determining a region for biometric light control in accordance with the principles of the invention

FIG. 9 illustrates an exemplary movement of eyewear 180 utilized for biometric movement control of lighting source 115 within lighting element 150 in accordance with the principles of the invention. In this illustrated exemplary embodiment, eyewear 180 (FIG. 1) includes a plurality of lens 120a, 120b joined by a bridge element 905, to which a lighting element 150 is attached. In this illustrated example, battery assembly 120 (which is shown in FIG. 1) is not shown so as to avoid obfuscation of the principles of the invention. However, it would be understood that eyewear 180 may be similar to that shown in FIG. 1 or may be configured such that battery assembly 120 is separate and remove from lighting element 150.

In this illustrated embodiment, lighting element 150 is oriented in a downward direction, as previously discussed, from horizontal axis 225, along optical axis 245, which is shown to be substantially similar to Line of Sight reference axis 240. Further illustrated are magnification lens 190a/190b incorporated into 120a/120b, respectively.

Further illustrated is axis 910 that represents an axis along which gravity may be determined (hereinafter referred to as Vg). As would be known in the art, the gravity vector Vg is substantially fixed in a locally downward direction. In the 3-axis coordinate system shown, the axis 910 may be represented as (0, 0, 1). That is a nominal orientation in X and Y axes (i.e., 0)) and a nominally downward (1) orientation in the Z axis.

In accordance with the principles of the invention, a position of a 3-axis PDD 635 in a stable condition (i.e., eyewear 180 substantially horizontal (roll axis), and vertical (Y-axis) and looking forward) in a stable, non-moving mode, with headlight element 150 pointed in a downward direction as shown in FIG. 1), establishes an orientation vector 915 that is substantially coincident to gravity axis Vg, 910, as the orientation of the PDD 635 may be represented as 0, 0, 1 (X, Y, Z) in the illustrated 3-dimensional coordinate system. Gravity vector (Vg) 910, accordingly, may be used as a reference (i.e., an axis of reference) from which a determination of the position of eyewear 180 and, consequentially, the direction or orientation of the light output of the light source 115 within lighting element 150 (i.e., Line of Sight reference axis 240), with respect to at least one axis defined by the coordinate system shown in FIG. 8 may be determined.

In this illustrated example, vector 915 is shown displaced from axis Vg, 910 to illustrate vector 915.

Determination of movement of the user's head (or lighting element 115) with respect to the 3-dimensional axis shown in FIG. 8, may be made with respect to Vg, 910, as illustrated. For example, movement of eyewear 180 (or lighting element 150 containing light source 115) with respect to the X- or Roll axis may alter the orientation of axis 915 generated (or experienced) by PDD 635 associated with the X-axis or Roll-Axis along line 920. The offset of the eyewear 180 from the nominal horizontal position of eyewear 180 shown in FIG. 1, converts to a deviation of vector 915 from its nominal position consistent with axis Vg, 910 (i.e. 0, 0, 1) to, for example, (0, 0.707, 0.707). Similarly, movement of eyewear 180 with respect to the Y- or Pitch axis may alter the orientation of vector 915 (shown as vector 916) generated (or experienced) by PDD 635 associated with the Y-axis along line 930 (e.g., (0.707, 0, 0.707). Similarly, movement with respect to the Z- or Yaw direction may alter the orientation of vector 915 (shown as vector 917) generated (or experienced) by PDD 635 along line 950. In accordance with the principles of the invention, a 3-axis PDD 635 (e.g., an accelerometer or gyroscope) may be used to produce X, Y and Z values with respect to the coordinate system shown in FIG. 8 from which orientation vector 915 may be generated (or experienced) by PDD 635 with respect to gravity axis Vg 910. Hence, the offset values from a nominal position of eyewear 180 associated with each axis may be determined based on the deviation of PDD (i.e., orientation) vector 915 with respect to the gravity reference vector (Vg) 910.

In addition, a Biometric Decision Algorithm (BDA) may utilize as a set point 925, the position of Vg 910 along the expected movement axes, 920, 930, and further utilize other preset or user settable angles (e.g., set point upper 970 and set point lower 980 associated with the Pitch axis) to create a 3-dimensional region of light output into which light may be emitted by light source 115 within headlight element 150. In this illustrated example, the set points 970, 980 (i.e., upper pitch set point and lower pitch set point) may be set such that a change in the orientation of headlamp 150 above the Line of Sight reference axis 240, 245 exceeding upper set point 970 may turn off the lighting source 115, whereas a change in the orientation of headlamp 150 below the lower set point 980 may turn off the lighting source.

In this exemplary embodiment illustrated, using the gravitational axis, 910 as a reference thus, the angular difference between gravitational axis 910 and upper set point 970 and the angular difference between the gravitational axis 910 and lower set point 980, define a region of acceptance associated with the Pitch axis. For example, the upper set point 970 may be set to be 10 degrees above the Line of Sight reference axis 240 and the lower set point 980 may be set as 50 degrees below the Line of Sight reference axis 240 (or 85 degrees below horizontal axis 225). Similarly, upper set point 975 and lower set point 985 may define a region of acceptance associated with the Roll axis. Similar, set points may be established for the Yaw axis. In this illustrated case, the upper set point 975 and the lower set point 985 are set to allow for an approximately ninety (90) degree roll of eyewear 180. Similarly, upper set point 976 and lower set point 986 are set to allow for an approximately ninety (90) degree yaw of eyewear 180 and upper and lower set points 970, 980, respectively, are set to allow for minor variation of eyewear 180 in an upward direction and major variation of eyewear 180 in a downward direction. As would be appreciated, the upper and lower set point values for each of the 3 axes may be set independently to specify specific regions in which biometric control of the lighting source may be achieved. For example, upper and lower set points 975, 985, respectively may be set to allow only a 10 degree change in the orientation of the headlight element 150 including lighting source 115 before the lighting source 115 is turned off. In accordance with the principles of the invention, the combination of the set points associated with each of the three axis establishes a region of acceptance for controlling the application of electrical energy (i.e., voltage or current) to lighting source 115.

Figure 10:
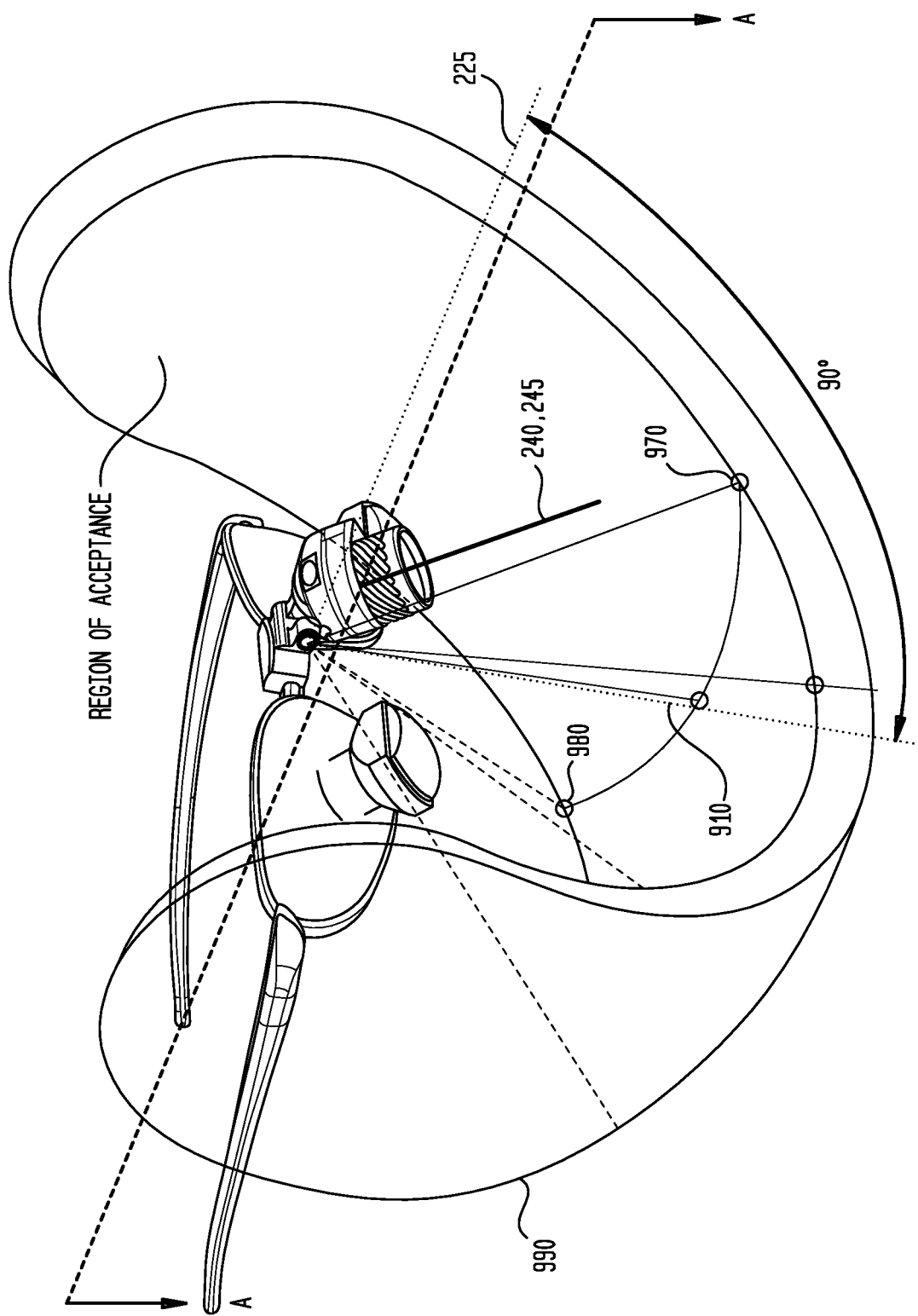
FIG. 10 illustrates a prospective of an exemplary region of acceptance 990 for biometric light control in accordance with the principles of the invention.

FIG. 10 illustrates an exemplary region of acceptance 990 formed by the upper and lower set points in the Roll and Pitch axes of three axes shown in FIG. 9. In this illustrated example of a region of acceptance 990, the lighting source 115 remains in an ON condition when the Line of Sight reference axis 240, 245 (and consequently the direction of light outputted by lighting source 115) remains within area 990. However, when the Line of Sight reference axis 240, 245 fails outside this exemplary region of acceptance 990, the lighting source 115 is turned OFF, such that no light is outputted. Hence, the X, Y and Z coordinate values, determined by PDD 635, are evaluated (either individually or collectively) to determine whether a position or orientation of Line of Sight axis 240, 245 is within region of acceptance 990 in order to determine whether light source 115 within headlight element 150 is to be activated in order turn the light or lighting source ON (i.e., apply a voltage or current to the light or lighting source), or deactivated to turn the light or lighting source OFF.

It would be understood, by those skilled in the art, the Line of Sight reference axis 240 may be pre-set to be coincident with the optical axis 245 of headlight 150 or to the gravitational axis or may be set, by the user, for example, to another axis. The upper set point 970, the lower set point 980 and the gravitational axis 960 may be determined with respect to the selected Line of Sight reference axis 240 to determine an exemplary region 990 in which light source 115 may be turned ON and a region in which light source 115 is to be turned OFF.

Although the region of acceptance is shown with regard to Roll and Pitch axes, it would be understood that the region of acceptance may further be determined with regard to the Yaw axis, without altering the scope of invention claimed.

Returning to FIG. 5, FIG. 5 illustrates a side view of eyewear 180 illustrating the relationship of upper set point 970 (shown in FIGS. 9, 10) associated with the Y- or Pitch axis (shown in FIG. 8) and lower set point 980 (shown in FIGS. 9, 10) associated with the Y- or Pitch axis for defining a region of acceptable light output in the Pitch axis, wherein lighting source 115 is turned ON to output a light when the Line of Sight axis 240, 245 is within this region and turned OFF when outside this region.

Accordingly, when the combination of the determination of the axis 915 generated by the PDD 635 with respect to the axis of references 910 is determined within the appropriate set points (and consequently within a region of acceptance 990), the light source 115 may be turned ON (or kept ON) by the application of a voltage or current to light source 115. Otherwise, the voltage or current is removed from light source 115 and the light is turned OFF.

The processing shown in FIG. 4 may be performed for each of at least one of the roll, the pitch and the yaw axes, wherein appropriate axial limits are employed for each axis.

Figure 11:
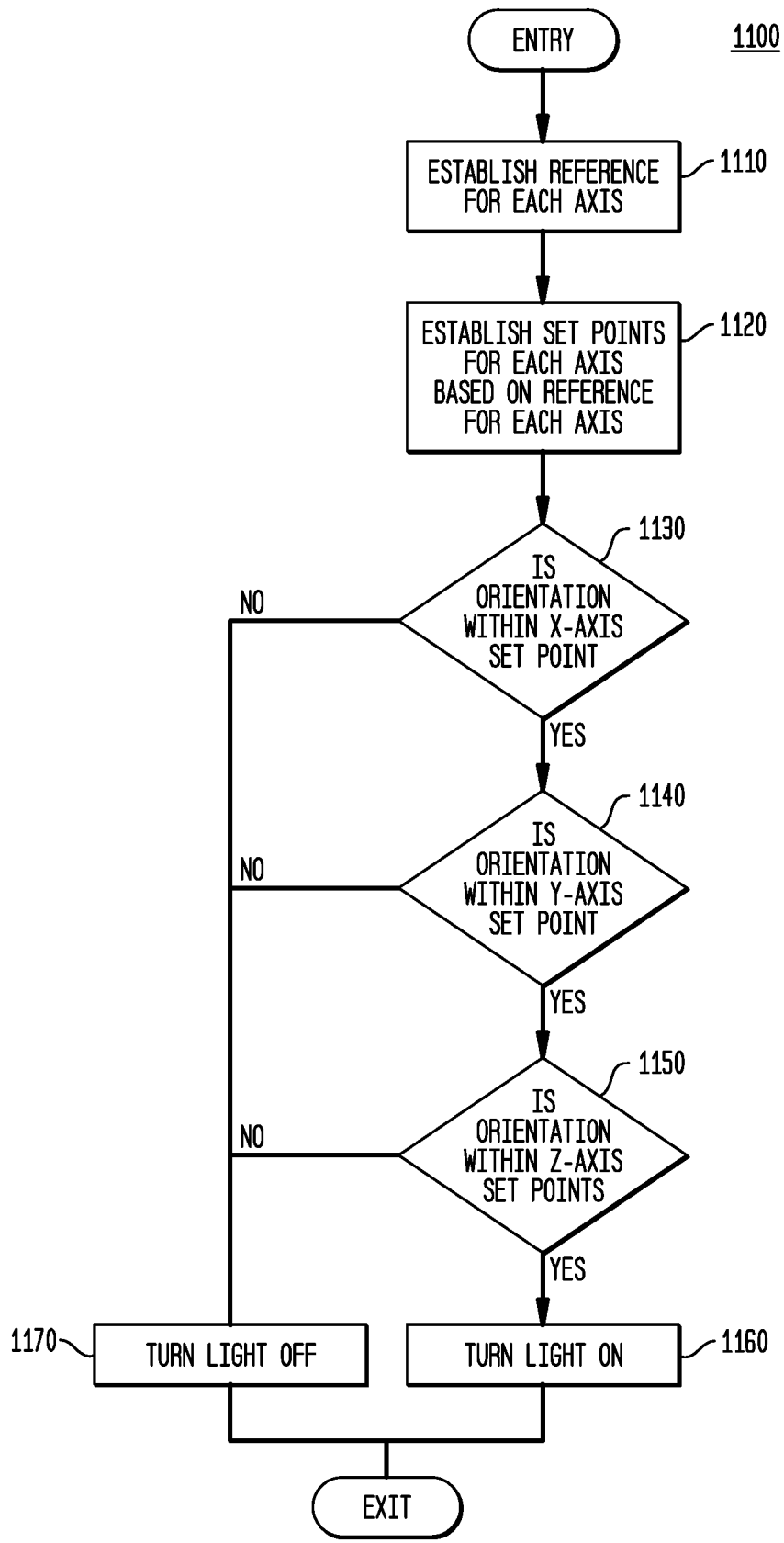
FIG. 11 illustrates a flow chart of an exemplary process in accordance with the principles of the invention.

FIG. 11 illustrates a flow chart 1100 of an exemplary process for determining lighting condition of light source 115 in accordance with the principles of the invention. In this illustrated embodiment, a reference axis is established at step 1110, from which set points are established for each of the at least one axis (preferable 3-axis) at step 1120. At step 1130 a determination is made whether the orientation of the eyewear 180 (or lighting element 150 containing light source 115), as determined by the PDD 635 measurement associated with the X-axis is within the set points established for the X-axis. If the determination is in the affirmative, then processing continues to step 1140, wherein a determination is made whether the orientation of the eyewear 180 (or lighting element 150 containing light source 115), as determined by the PDD 635 measurement associated with the Y-axis is within the set points established for the Y-axis. If the determination is in the affirmative, then processing continues to step 1150 wherein a determination is made whether the orientation of the eyewear 180, as determined by the PDD 635 measurement associated with the Z-axis is within the set point established of the Z-axis. If the determination is in the affirmative, then processing continues to step 1160, wherein the lighting source 115 is turned (or kept) ON by the application of a voltage or current to lighting source 115.

However, if any of the determinations requiring the orientation of the eyewear 180 (or lighting element 150 containing light source 115) made at steps 1130, 1140 or 1150 result in a negative (i.e., outside the corresponding set points), the processing passes to step 1170, wherein the light source 115 is turned OFF by the removal of a voltage or current to light source 115.

Although FIG. 11 illustrates the processing associated with 3 axes of a 3-axis coordinate system, it would be appreciated that the processing for determining a region of acceptance may be performed in two (2) axes. For example, in the roll and pitch axes without altering the scope of the invention.

Figure 12:
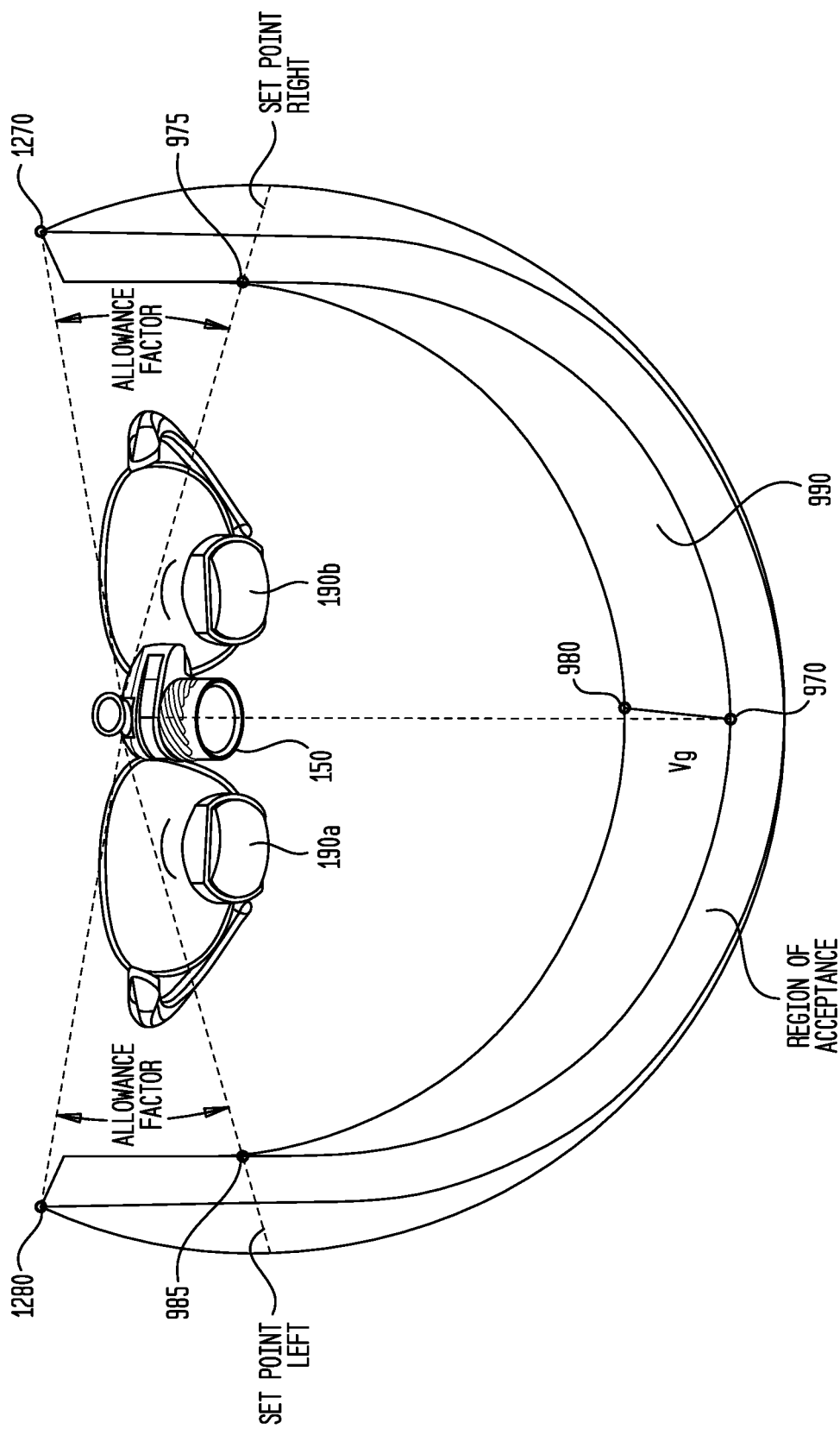
FIG. 12 illustrates front view of an exemplary region of biometric light control in accordance with the principles of the invention.

FIG. 12 illustrates a front view of an exemplary biometric system for determining movement of a user's head for controlling lighting source 115 in accordance with the principles of the invention.

In accordance with the principles of the invention, to counteract a sharp cutoff of the region of allowed light transmission (i.e., region 990) an allowance factor is shown to further be incorporated into the set points. For example, a second set of set points (e.g., 10 degrees) may be established about the first set of set points for each of the axes to allow adaptive control of the lighting source when the user moves their head (and consequently the lighting element 150) toward one of an upper set point limit or a lower set point limit. The second set of set points may extend the range of light ON conditions, wherein the lighting source 115 is not turned off when the position of the lighting source 115 is determined to exceed a first one of the upper and lower set point limits. Rather, the magnitude of the electrical energy applied to the lighting source 115 may be reduced when the position or movement of the lighting source is determined to exceed a first set point limit and be within a region between the first set point and the second set point.

This additional region of allowable light output (i.e., an allowance factor) rounds off the region of acceptance of light output allowing the user to move their line of sight in extreme angles, without imposing erratic operation of the light being turned ON and turned OFF at the edges of boundaries set by the upper and lower set point limits. Thus, compensation for the user to move their head (and consequently, the headlight element 150) along the roll axis, in this illustrated case, is achieved. A similar allowance factor may be incorporated for movement in the yaw axis and the pitch directions if desired.

As illustrated, with the gravitational axis 910 established as an axis of reference, left and right set points 1270 and 1280 may be set (for example, 10 degrees) above set points 975, 985, respectively, to allow for movement of the user's head in a Roll direction (see FIG. 8) greater than the originally disclosed set point.

Although the invention has been described with regard to the Roll axis (FIG. 12), it would be understood that a similar configuration of establishing a lower set point and an upper set point for movement in the Yaw and Pitch directions may be established. The axis of reference (in this illustrated case, the gravitational axis 910) may be compared to the orientation of PDD 635 to determine the status of the light source 115 within lighting element 150, as has been discussed.

Returning to FIG. 9, in accordance with the principles of the invention, the region of acceptance 990 is determined based on setting set point limits for each of the 3 axes of a 3 axis coordinate system and a determination being made based on whether the Line of Sight axis falls outside the determined region of acceptance.

In a preferred embodiment, processing may further consider the orientation of the vector Vg 910 and whether the orientation of vector Vg lies within the region of acceptance 990 to determine whether the lighting source is to be turned On or turned Off.

Figure 13:
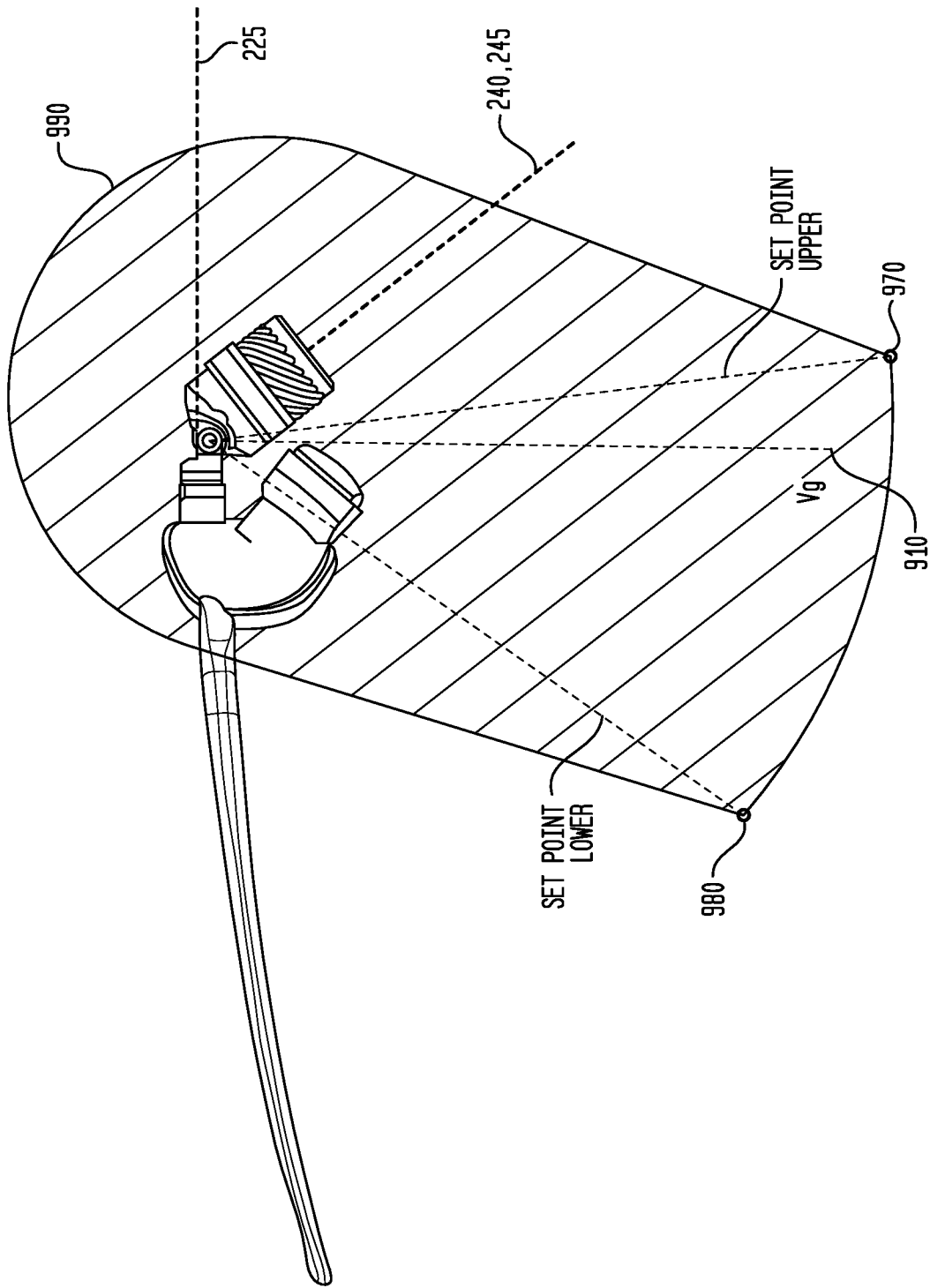
FIG. 13 illustrates a side view, through section A-A of FIG. 10.

FIG. 13 illustrates a side view, through sectional line A-A, FIG. 10, wherein Vg, 910 is used as the reference axis for determining the operational conditions of lighting source 115.

In this illustrated example, upper set point limit 970 and lower set point limit 980, respectively, are set as previously described.

Further illustrated is gravity vector 910 extending downward indicating the direction of reference axis.

In this second exemplary embodiment of the invention, the region of acceptance 990, after being determined with regard to the Line of Sight axis 245, as previously discussed, is then recomputed as the line of Sight axis 245 moves as the user moves. The position or orientation of gravity vector Vg 910 is then measured with regard to the recomputed/repositioned region of acceptance 990.

Specifically, after the Line of Sight axis 240 and the corresponding region of acceptance 990 based on the determined Line of Sight axis 240 are established, a relationship between gravity vector 910 and the determined Line of Sight axis 240 may be established. As the optical axis 245, with corresponds to the Line of Sight axis 240, during the calibration phase, of the lighting element 150 is moved, the region of acceptance 990 is recomputed based on the new orientation of the optical axis 245. The gravity vector Vg 910 is then measured with respect to the boundaries of the re-computed region of acceptance 990 to determine the condition of the lighting source 115 (i.e., ON or OFF).

Figure 14A:
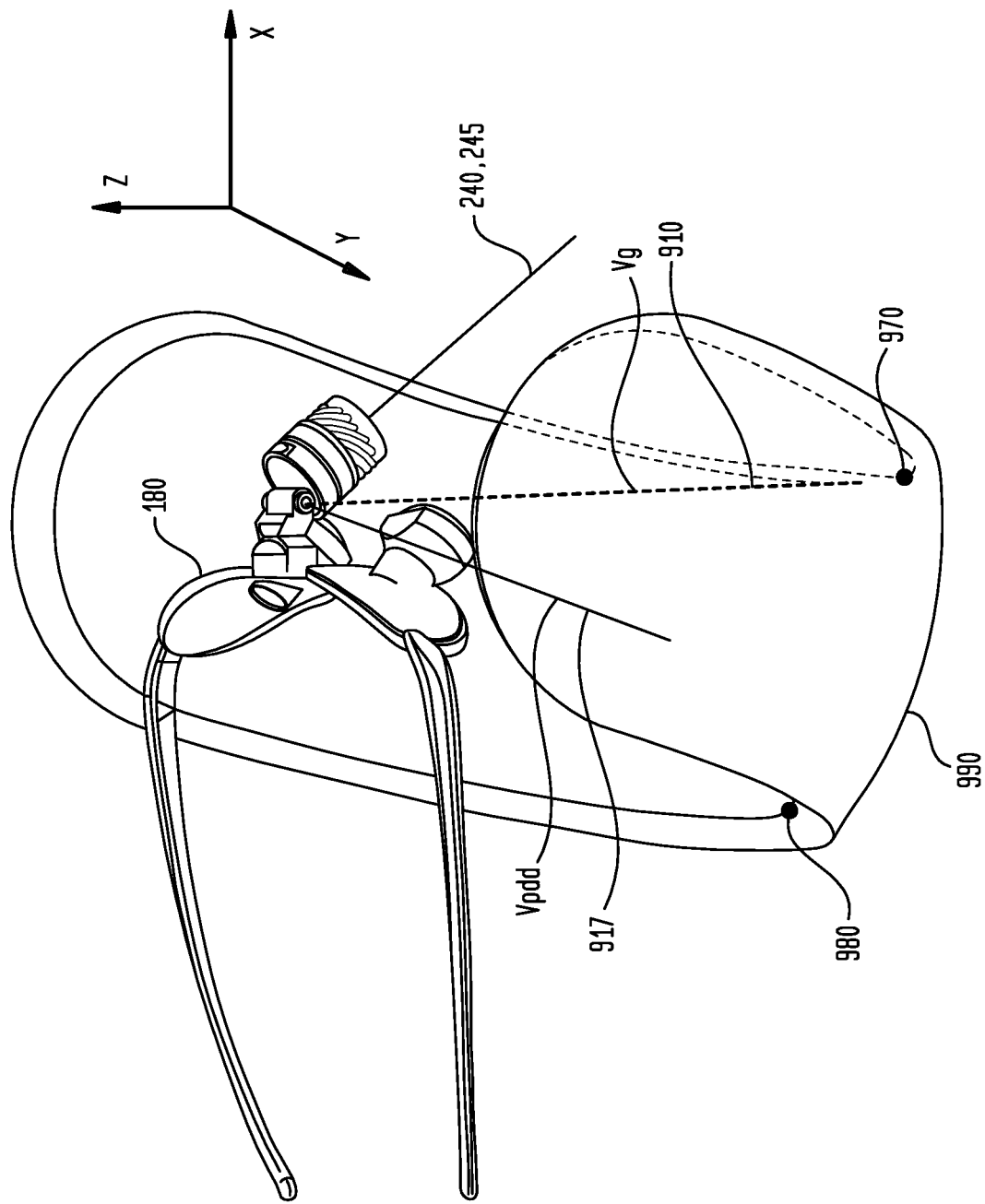
FIG. 14A illustrates a prospective view of a first exemplary aspect of the biometric light control in accordance with the principles of the invention.

FIG. 14A illustrates an exemplary example of the determination of the condition of light source 115, based on an orientation of gravity vector Vg, 910 with respect to the region of acceptance 990. In this illustrated example, vector Vg, 910 is within the region of acceptance 990 and, thus, voltage or current is applied to light source 115 such that a light is emitted from light source 115.

Figure 14B:
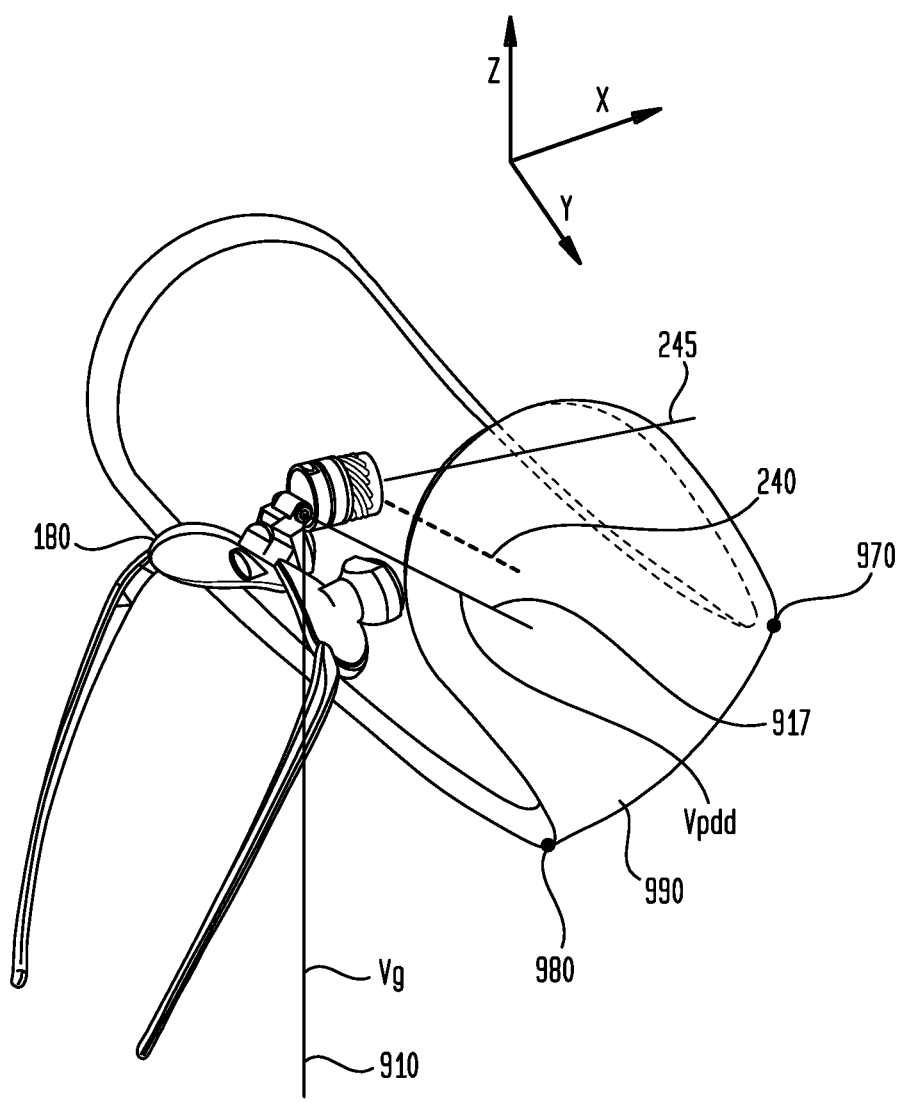
FIG. 14B illustrates a prospective view of a second exemplary aspect of the biometric light control in accordance with the principles of the invention.

FIG. 14B illustrates a second exemplary example of the determination of the condition of light source 115, based on an orientation of gravity vector Vg, 910 with respect to the region of acceptance 990. In this illustrated example, the eyewear 180 is positioned or oriented in an upward (i.e., Pitch) direction wherein the optical axis 245 is no longer substantially coincident to the reference axis 240. In this case, the region of acceptance 990 is shown being positioned upward to retain region of acceptance 990 in a fixed relationship to the optical axis 245. Thus, the upper and lower set point angles associated with each of the axes (in this illustrated case, the Pitch and Roll axes) move in space to retain region of acceptance 990 in a fixed relationship to optical axis 245.

Further illustrated is vector Vg, 910, extending downward (along the Z axis) as the orientation of vector Vg, 910 is fixed and independent of the orientation of eyewear 180. In this illustrated case, vector Vg, 910 is shown outside the re-computed region of acceptance 990. As vector Vg, 910 is outside the region of acceptance 990, the voltage or current is removed from light source 115 to prevent light output from light source 115.

Figure 15:
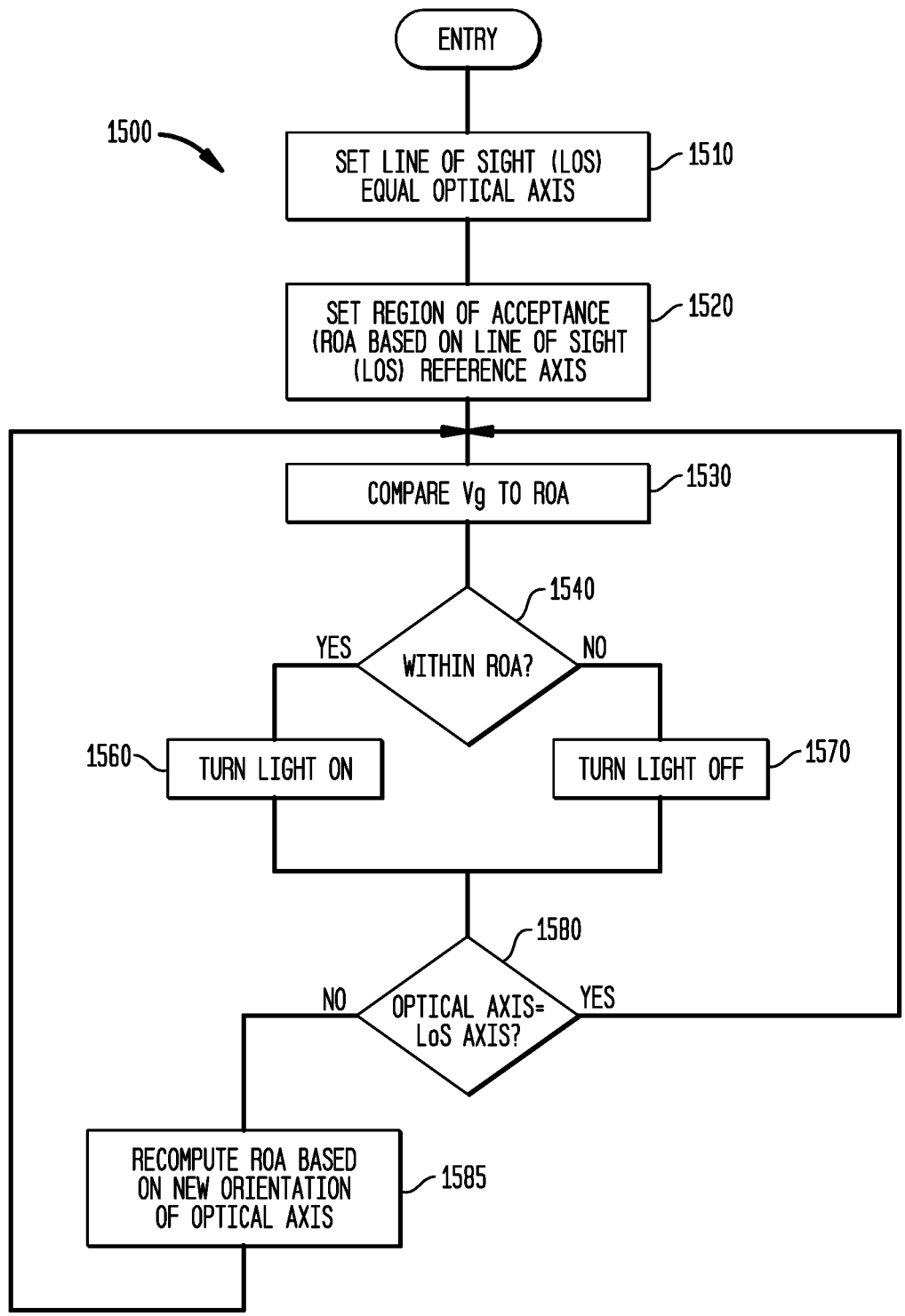
FIG. 15 illustrates a flow chart of an exemplary processing in accordance with a second exemplary aspect of the invention.

FIG. 15 illustrates a flow chart 1500 of an exemplary processing in accordance with this second exemplary embodiment of the invention.

In this exemplary processing, a Line of Sight reference axis is set at block 1510 in accordance with the processing shown in FIG. 3. In one aspect of the invention, the Light of Sight reference axis 240 is set to be comparable to the optical axis 245 of the lighting element. After the Line of Sight reference axis 240 is set comparable to the optical axis 245, a determination of the region of acceptance is made at block 1520. The region of acceptance is determined as previously discussed. See for example, FIG. 9, wherein the region of acceptance is shown with respect to the Roll (Y) axis and the Pitch (X) axis. At block 1530, an evaluation of the orientation of gravitational axis Vg with respect to the region of acceptance is made. As previously discussed, the vector Vg, 910 may be represented in a 3-dimensional system as X=0, Y=0, Z=1. The region of acceptance may be defined within the 3 axes in a similar manner. For example, the Line of Sight reference axis 245 oriented at a downward angle of 45 degrees may be represented as 0, 0.707, 0.707 and the region of acceptance may be established, for example, at least in the X (Roll) and Y (Pitch) axes. Such region of acceptance is shown in FIG. 9, for example.

At block 1540, a determination is made whether vector Vg, 910 is within the region of acceptance. If yes, the processing continues to block 1560, wherein voltage or current is applied to light source 115 to cause the emission of light. However, if the answer is in the negative (i.e., Vg, 910 is outside of the region of acceptance), processing continues to step 1570 to cause the voltage or current to be removed from light source 115.

Processing continues to step 1580 where a determination is made whether the orientation of the optical axis of the lighting source 115 has moved from the Line of Sight axis. If it is determined the orientation of the optical axis has moved (i.e., NO branch) then processing continues to step 1585 wherein a new region of acceptance is determined with respect to the new orientation of the optical axis. Processing then continues to step 1530 to determine whether the gravitational vector Vg, 910, is within the newly re-computed region of acceptance.

However, if the answer is in the positive (i.e., Yes branch), processing continues to step 1530 to monitor the orientation of vector Vg with respect to the current region of acceptance.

As would be appreciated, the processing shown in FIG. 15 may be initiated by an interrupt, wherein an event, such as the expiration of a known time period, occurs or it is determined that the optical axis is no longer coincident with the Line of Sight axis. Or may be initiated by polling PDD 635 at a known rate to determine the current orientation of the optical axis with respect to the Line of Sight axis. That is, the determination of movement of the optical axis may be performed on a continuous basis, a deterministic basis, or on an event driven basis.

Figure 16:
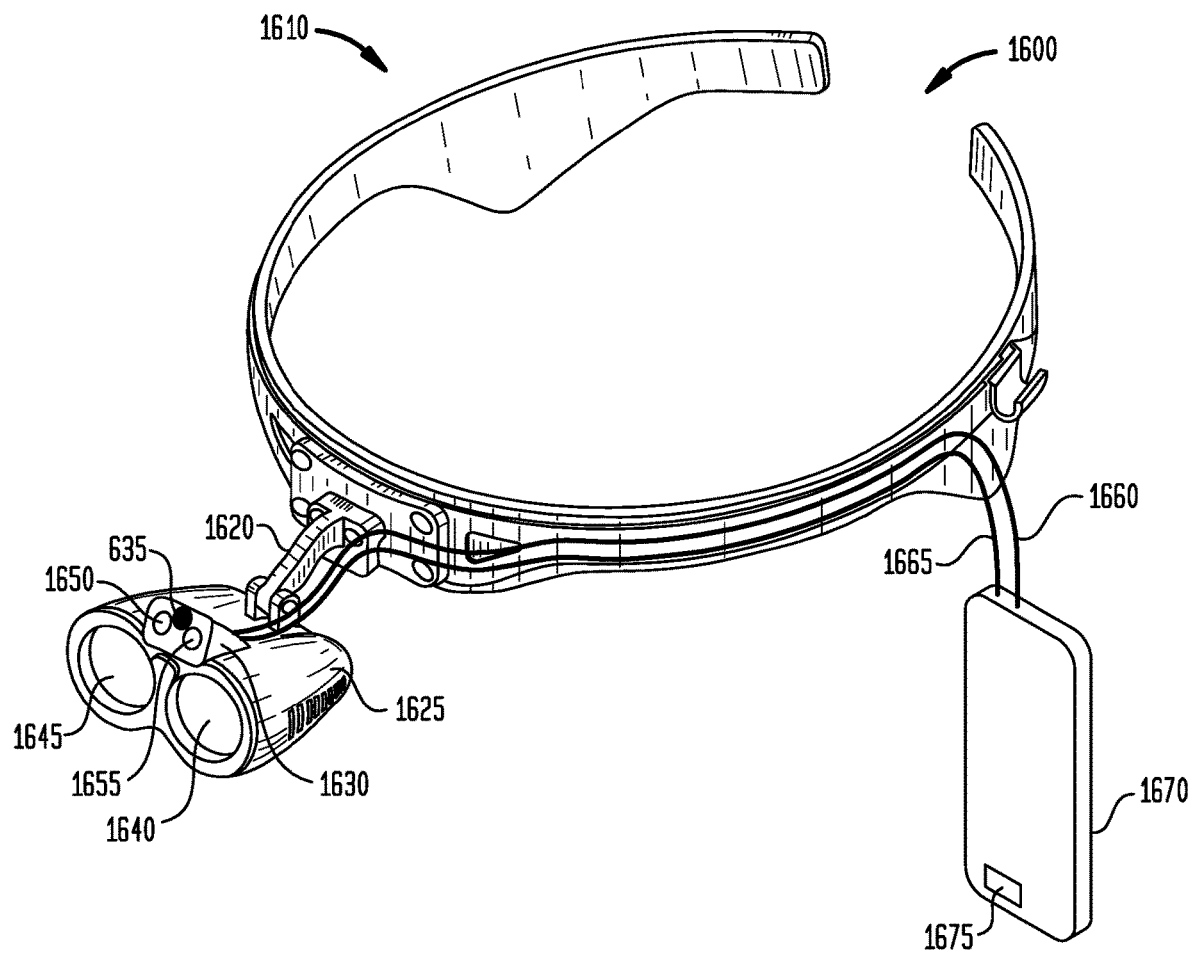
FIG. 16 illustrates a second exemplary embodiment of a lighting device in accordance with the principles of the invention.

FIG. 16 illustrates an exemplary head-band configuration for attaching a lighting element to a user, wherein the battery element is remote from the lighting source. The head band configuration shown FIG. 16 is comparable to the head band shown in FIG. 11 of the referred to U.S. Pat. No. RE46463, the contents of which are incorporated by reference, herein. In this illustrated embodiment 1600, head band 1610 represents an alternative means for attaching a lighting element 1625 to a user. Lighting element 1625 includes two lighting elements 1640 and 1645, each of which contains lighting sources, similar to lighting source 115, and extends, in this illustrated embodiment, from headband 1610 by bracket 1620. Further illustrated are transmitter 1650 and receiver 1655, which are similar to sensor 185 shown in FIG. 1. Transmitter 1650 and receiver 1655 operate in a manner similar to sensor 185 to set the Line of Sight reference angle (see FIG. 3, for example) or to determine an intensity of the light outputted by the lighting sources (see FIG. 7). Further illustrated is PDD 635 that determines an orientation of lighting element 1625, as previously discussed.

In this exemplary embodiment battery 1670 is positioned remote from the lighting element 1625 and electrical energy from the battery 1670 is provided to lighting element 1625 through wired connections 1660, 1665. Also illustrated is switch 1675, which provides an initial level of voltage or current to the lighting sources within lighting element 1625. In one aspect of the invention, electrical energy may be provided to the lighting sources within lighting element 1625 when switch 1675 is activated. This application may be for a limited period of time, during which a user may set the Line of Sight reference axis and the region of acceptance. Thereafter, control of the light output may be determined by a processor or application specific electric circuitry (e.g., ASIC or FPGA), as previously discussed, that performs the processing shown in FIG. 15.

Although control of electrical energy provided to lighting source 115 is discussed with regard to PCB 600 including a switch, it would be recognized that in the configuration shown in FIG. 16, the switch to control the application of electrical energy (e.g., voltage, current) and/or sensors 1650 and 1655 may be incorporated into battery unit 1670 without altering the scope of the invention claimed.

Although the term "eyewear" has been used throughout the discussion of the invention defined by the claims, it would be understood that the eyewear is only one means for retaining a biometric light control to a user and that other means, such as headbands, head-straps and clips have been contemplated and considered within the scope of the invention claimed.

In an alternative aspect of the invention, information associated with the position of the eyewear 180 (and consequentially the position of the lighting element 150 along the Roll, Pitch and Yaw axes) may be combined to form a spherical measurement $(R, \theta, \phi)$ that represents the orientation of the lighting source 150 (and the optical axis 245) in a space defined by a 3-dimensional spherical coordinate system. The orientation of the optical axis may then be compared to set points similar to those shown in FIG. 9, for example, defined within the 3 dimensional spherical coordinate to define an area of acceptable light output (I.e., a region of acceptance). Additional, information associated with the position of the eyewear 180 may be combined to form a cylindrical measurement $(R, \theta)$ that represents the orientation of the lighting source 150 in a space defined by a cylindrical coordinate system.

In summary, a device for hands-free control of a lighting element is disclosed, wherein the device comprises processing for accepting input data associated with movement and/or position detecting devices, from which an orientation of the lighting element may be determined. From the orientation of the lighting element, the device may determine whether voltage or current, provided by an external source, such as a battery or electrical power supply, is to be applied to the lighting source within the lighting element or removed from the lighting source. In addition, an initial orientation of the lighting element, from which an area of allowed light output (i.e., region of acceptance) may be determined. From the determined region of acceptance, control of the lighting element may be subsequently determined. The initial orientation may be pre-determined or may be established by the user. In addition, the size of the area of allowed light output may be determined by the user or may be predetermined. The size of the area may be determined by set points or limiting values associated with each of at least two axes of a three-dimensional coordinate system that may be pre-set or may be determined by the user.

In accordance with one aspect of the invention, the region of acceptance is fixed, and processing determines the orientation of the Line of Sight reference axis to determine the condition of the lighting source (i.e., turned ON or turned OFF). In another aspect of the invention, the region of acceptance is fixed with respect to the Line of Sight axis and a determination is made whether a gravitational axis is within the region of acceptance to determine the condition of the lighting source (i.e., turned ON or turned Off).

Although the invention has been described with regards to a LED, it would be recognized that the term "a LED" is a term of art and refers to a lighting source. Whereas the invention has been described with reference to a LED it would be understood that other lighting sources may be incorporated into the invention disclosed without undue modification and, thus, considered within the scope of the invention claimed. Similarly, the sensing unit 185 has been discussed as being an IR sensor, however, it would be understood that sensing unit 185 may be a contact sensor, such as a capacitive touch sensor etc., or other types of contactless sensors, such as RF, etc. Furthermore, the light output is referred to being within a frequency or wavelength range. However, it would be further understood that light, particularly with regard to Light Emitting Diodes, may be further measured in color temperature, as degrees Kelvin. For example, a soft white light may be measured in a range of 2700° K. whereas a bright white light may be expressed in a range of 3000° K. Hence, one of ordinary skill in the art would appreciate that the reference to light or emitted light may be measured as frequency, wavelength or color temperature, and such terminology of light is incorporated and used interchangeably, herein.

One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention. Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure. Furthermore, the values presented herein are merely to illustrate the concepts and are not to be considered as the only values that have been contemplated and considered.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A lighting device comprising:
    a light source configured to output a light along an optical axis;
    a light control device comprising:
        a switch configured to pass an electrical energy from an electrical source to said light source;
        a position detector circuit configured to:
            determine an orientation of said light source with respect to at least one axis in a coordinate system; and
            transmit an orientation signal, wherein said orientation signal is associated with said orientation of said light source with respect to each of said at least one axis;
        a sensor comprising:
            a transmitter configured to transmit a signal; and
            a receiver configured to:
                receive a reflection of said transmitted signal, wherein said sensor is configured to:
                    transmit a detection signal, wherein said detection signal is associated with receiving said reflection of said transmitted signal;
        a processor configured to:
            receive the orientation signal the detection signal;
            compare each of said signals of said orientation signal associated with a corresponding one of said at least one axis with known limit values associated with said corresponding one of said at least one axis, wherein said known limit values are established with respect to a reference axis;
            determine whether said orientation of said light source is within said known limit values associated with each of said at least one axis; and
            control the switch to pass said electrical energy to said light source when said position of said light source is determined within said known limit values associated with each of said at least one axis, wherein said processor is further configured to:
                determine a duration of said detection signal; and
                set the reference axis comparable to a current optical axis orientation when said duration of said detection signal is greater than a predetermined time.

2. The lighting device of claim 1, wherein the processor is configured to:
    control said switch to block said electrical energy to said light source when said orientation of said light source is determined outside of said known limit values associated with at least one of said at least one axis.

3. The lighting device of claim 1, wherein the processor is configured to:
    control said switch to pass said electrical energy to said light source, when said position of said light source is determined outside of said known limit values associated with at least one of said at least one axis, wherein said electrical energy applied to said light source is reduced in magnitude.

4. The lighting device of claim 3, further comprising a second set of known limit values for at least one of said at least one axis.

5. The lighting device of claim 4, wherein said processor is configured to:
    control said switch to block said electrical energy to said light source when said orientation of said light source is determined outside of said second set known limit values associated with at least one of said at least one axis.

6. The lighting device of claim 1, wherein said known limit values are pre-determined for each of said at least one axis with respect of said reference axis.

7. The lighting device of claim 1, wherein said known limit values are user settable for each of said at least one axis with respect to said reference axis.

8. The lighting device of claim 1, wherein said reference axis is substantially coincident with said optical axis.

9. The lighting device of claim 1, wherein said reference axis is different than said optical axis.

10. The lighting device of claim 1, wherein said position detection device associated with at least one of said at least one axis is one of: a gyroscope and an accelerometer.

11. The lighting device of claim 1, wherein said position detection device is one of: a 3-axis gyroscope and a 3-axis accelerometer.

12. The lighting device of claim 1, wherein said processor is configured to:
  perform, when said duration of said detection signal is less than said predetermined time, one of adjust a magnitude of the electrical energy to the lighting source and change a color of the outputted light.

13. The lighting device of claim 12, wherein said adjustment of said magnitude of the electrical energy applied to the lighting source comprises one of: increase said magnitude and decrease said magnitude.

14. The lighting device of claim 12, wherein said change of a color of the outputted light is one of: changing of a color temperature of said lighting source and changing of a wavelength of light outputted by said lighting source.

15. A lighting system comprising:
  a lighting device comprising:
    a headlight element comprising a lighting source therein;
  an electronic section pivotably attached to the headlight element, said electronic section comprising:
  a position detection device configured to:
    determine an orientation of said head mounted lighting system in at least two axes within said 3-axis coordinate system;
    transmit said determined orientation for each of said two axes of said 3-axis coordinate system; and
  a processor configured to:
    receive said determined orientation for each of said two axes of said 3-axis coordinate system;
    determine whether said determined orientation by said lighting source is within a region defined by set point limit values associated with each of said two axes of said 3-axis coordinate system; and
    perform one of: allow passage of an electrical energy to the lighting source when said lighting source is within said region and block said electrical energy to the lighting source when said lighting source is outside said region.

16. The lighting system of claim 15, wherein said processor is configured to:
  compare said determined orientation for each of said at least two axes with set point limit values associated with a corresponding one of said at least two axes; and
  determine said lighting source is within said region when each of said provided offset values is within corresponding set point limit value.

17. The lighting system of claim 15, wherein said processor is configured to:
  determine an orientation of said headlight source based on said determined orientation associated with at least two axes of said 3-axis coordinate system.

18. The lighting system of claim 15, wherein said set point limit values associated with each of said at least two axes of said 3-axis coordinate is predefined with respect to an optical axis associated with said headlight element.

19. The lighting system of claim 15 comprising:
  a battery configured to provide said electrical energy to said lighting source, wherein said battery is one of: remote from said lighting device and attached to said lighting device.

20. A light control system comprising:
  a light source configured to output a light along an optical axis;
  a light control device comprising:
    a sensor circuit configured to:
      transmit a signal; and
      detect a reflection of said signal;
    a position detector circuit configured to:
      determine an orientation of said light source; and
    a processor configured to:
      receive an indication of said detected reflection of said signal and said determined orientation of said light source;
      determine a region of acceptance based on a reference axis, wherein said reference axis is established as said optical axis of said light source;
      compare an orientation of a fixed reference value with said region of acceptance;
      determine whether said fixed reference value is within said region of acceptance; and
      control a switch to pass electrical energy to said light source when said orientation of said fixed reference is within said region of acceptance.

21. The light control system of claim 20, wherein the processor is configured to:
  determine a change in the orientation of the optical axis;
  recompute the reference axis and the region of acceptance based on the changed orientation of the optical axis; and
  control said switch to pass electrical energy to said light source when said orientation of said fixed reference is within said recomputed region of acceptance.

22. The light control system of claim 20, wherein the processor is configured to:
  determine a duration of said detected reflection of said signal;
  set the reference axis as the determined orientation of said optical axis based on said duration of said detected reflection of said signal being greater than a predetermined value.

23. The light control system of claim 20, wherein the processor is configured to:
  control said switch to block electrical energy to said light source when said orientation of said fixed reference is outside said recomputed region of acceptance.

24. A light control system comprising:
  a light source configured to output a light along an optical axis;
  a position detector circuit configured to determine an orientation of said optical axis;
  a processor configured to:
    receive an indication of a current orientation of said optical axis;
    compare said received indication of said current orientation of said optical axis with a prior orientation of said optical axis;
    determine a region of acceptance about said received indication of said current orientation of said optical axis when said received indication of said current orientation of said optical axis is different than said prior orientation of said optical axis;

determine whether a fixed reference is within the determined region of acceptance; and alter operation of the light source to prevent the output of said light when said fixed reference is outside said region of acceptance.

\* \* \* \* \*

UNITED STATES PATENT AND TRADEMARK OFFICE
CERTIFICATE OF CORRECTION

PATENT NO. : 10,667,357 B1
APPLICATION NO. : 16/541379
DATED : May 26, 2020
INVENTOR(S) : Richard E. Feinbloom et al.

Page 1 of 1

It is certified that error appears in the above-identified patent and that said Letters Patent is hereby corrected as shown below:

In the Claims

Column 20, Line 17, Claim 1 delete "signal the" insert therefor --signal and the--

Column 21, Line 6, Claim 10 delete "device" insert therefor --circuit--

Column 21, Line 9, Claim 11 delete "device" insert therefor --circuit--

Column 21, Lines 34-35, Claim 15 delete "head mounted lighting system" insert therefor --lighting device--

Column 21, Line 35, Claim 15 delete "said" insert therefor --a--

Signed and Sealed this
Fifteenth Day of September, 2020

Andrei Iancu
*Director of the United States Patent and Trademark Office*